(12) United States Patent
    Sauer et al.

(10) Patent No.: US 10,298,823 B2
(45) Date of Patent: May 21, 2019

(54) VEHICLE CAMERA HOUSING WITH TOLERANCE COMPENSATING CONNECTOR

(71) Applicant: MAGNA ELECTRONICS INC., Auburn Hills, MI (US)

(72) Inventors: Stefan Sauer, Waldaschaff (DE); Jens Steigerwald, Sailauf-Eichenberg (DE); Nazar F. Bally, Sterling Heights, MI (US); Marc Sigle, Alzenau (DE); Achim Newiger, Aschaffenburg (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 903 days.

(21) Appl. No.: 14/609,650

(22) Filed: Jan. 30, 2015

(65) Prior Publication Data

US 2015/0222795 A1    Aug. 6, 2015

Related U.S. Application Data

(60) Provisional application No. 62/093,741, filed on Dec. 18, 2014, provisional application No. 62/090,157, filed on Dec. 10, 2014, provisional application No. 62/074,905, filed on Nov. 4, 2014, provisional application No. 62/054,505, filed on Sep. 24, 2014, provisional application No. 62/035,614, filed on Aug. 11, 2014, provisional application No. 62/032,661, filed on Aug. 4, 2014, provisional application No. 62/027,463, filed on Jul. 22, 2014, provisional application No. 62/018,868, filed on Jun. 30, 2014, provisional application No. 62/003,734, filed on May 28, 2014, provisional application No. 61/993,736, (Continued)

(51) Int. Cl.
    *H04N 5/225* (2006.01)
    *B60R 11/04* (2006.01)
    *B60R 11/00* (2006.01)

(52) U.S. Cl.
    CPC .......... *H04N 5/2257* (2013.01); *B60R 11/04* (2013.01); *H04N 5/2252* (2013.01); *B60R 2011/004* (2013.01); *B60R 2011/0043* (2013.01)

(58) Field of Classification Search
    CPC .............. B60R 11/04; B60R 2011/004; B60R 2011/0043; H04N 5/2252; H04N 5/2257
    See application file for complete search history.

(56) References Cited

U.S. PATENT DOCUMENTS 5,550,677 A    8/1996  Schofield et al.
5,670,935 A    9/1997  Schofield et al.

(Continued)

*Primary Examiner* — Md N Haque
(74) *Attorney, Agent, or Firm* — Honigman LLP

(57) ABSTRACT

A camera assembly for a vehicle vision system includes a housing having a first housing portion and a second housing portion, with a circuit element disposed within the first housing portion. The second housing portion has a connector portion configured for connecting to a vehicle wiring when the camera assembly is installed at a vehicle. A coaxial connector is disposed at the connector portion of the second housing portion. The coaxial connector includes a plurality of electrical coaxial connector elements. Each of the electrical coaxial connector elements has (i) a first end that is configured for electrically connecting to circuitry of the circuit element within the first housing portion and (ii) a second end that is configured for electrically connecting to the vehicle wiring.

18 Claims, 54 Drawing Sheets

Related U.S. Application Data filed on May 15, 2014, provisional application No. 61/950,261, filed on Mar. 10, 2014, provisional application No. 61/935,056, filed on Feb. 3, 2014.

(56) References Cited

U.S. PATENT DOCUMENTS

| | | |
|---|---|---|
| 5,949,331 A | 9/1999 | Schofield et al. |
| 7,965,336 B2 | 6/2011 | Bingle et al. |
| 8,503,061 B2 | 8/2013 | Uken et al. |
| 8,542,451 B2 | 9/2013 | Lu et al. |
| 8,866,907 B2 | 10/2014 | McElroy et al. |
| 9,233,641 B2 | 1/2016 | Sesti et al. |
| 9,609,757 B2 | 3/2017 | Steigerwald |
| 2001/0048215 A1* | 12/2001 | Breed ............... B60N 2/0232 280/728.1 |
| 2010/0097519 A1* | 4/2010 | Byrne ............... B60R 1/00 348/373 |
| 2011/0310248 A1 | 12/2011 | McElroy et al. |
| 2013/0222595 A1 | 8/2013 | Gebauer et al. |
| 2013/0242099 A1 | 9/2013 | Sauer et al. |
| 2013/0328672 A1 | 12/2013 | Sesti et al. |
| 2013/0344736 A1 | 12/2013 | Latunski |
| 2014/0103624 A1* | 4/2014 | Breed ............... B60R 21/0132 280/728.3 |
| 2014/0138140 A1 | 5/2014 | Sigle |
| 2014/0320636 A1 | 10/2014 | Bally et al. |
| 2014/0362209 A1 | 12/2014 | Ziegenspeck et al. |
| 2014/0373345 A1 | 12/2014 | Steigerwald |
| 2015/0222795 A1 | 8/2015 | Sauer et al. |
| 2015/0266430 A1 | 9/2015 | Mleczko et al. |
| 2015/0365569 A1 | 12/2015 | Mai et al. |
| 2016/0037028 A1 | 2/2016 | Biemer |
| 2016/0268716 A1 | 9/2016 | Conger et al. |
| 2017/0133811 A1 | 5/2017 | Conger et al. |

\* cited by examiner

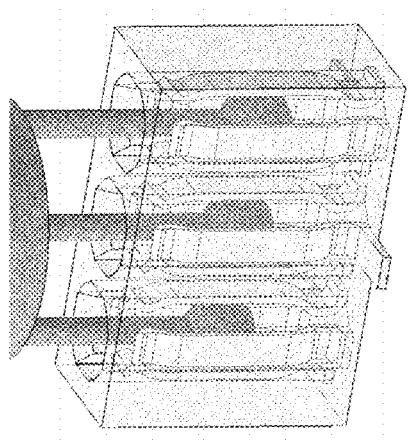
FIG. 7D
Compensation of the tolerances which are caused because of rotating of the pcb to the x and y axis and displacement parallel to the z axis
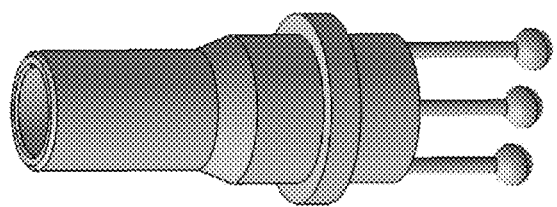
FIG. 7A
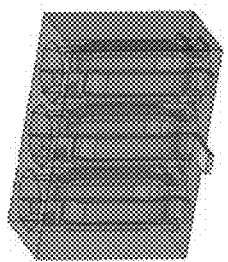
FIG. 7C
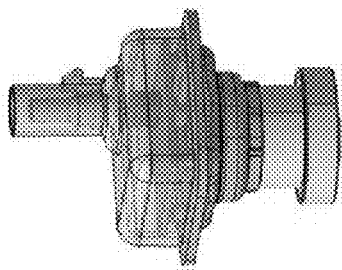
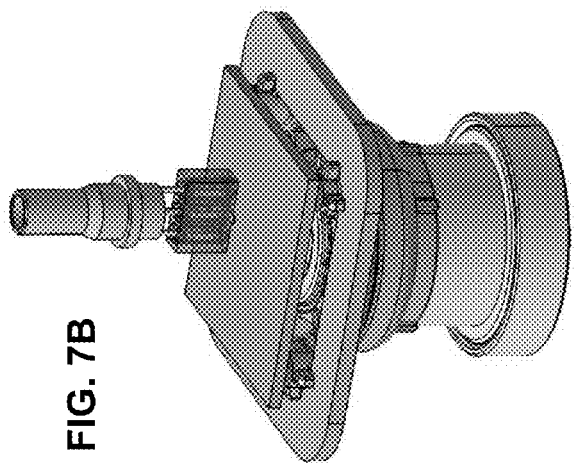
FIG. 7B Compensation of the tolerances which are caused because of rotating of the pcb to the x and y axis and displacement parallel to the z axis Rotating of the pcb to the x and y axis to each 2°

The PCB where rotated each 2 degrees to their central axis. Tolerance compensation should work in connection with the floating concept.

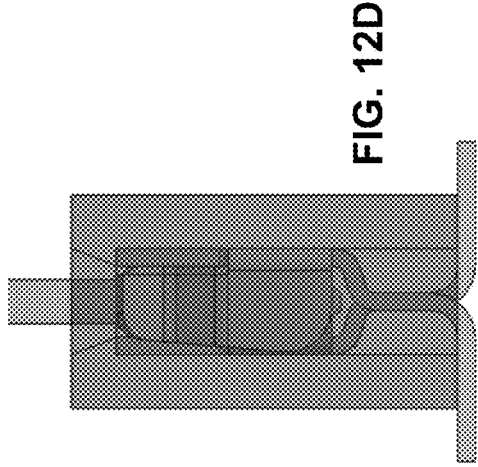
FIG. 12C
FIG. 12D
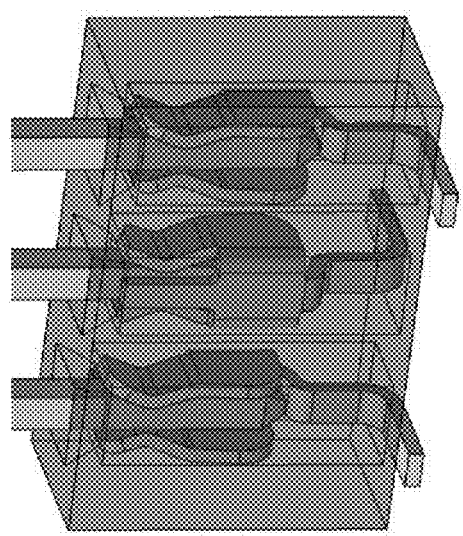
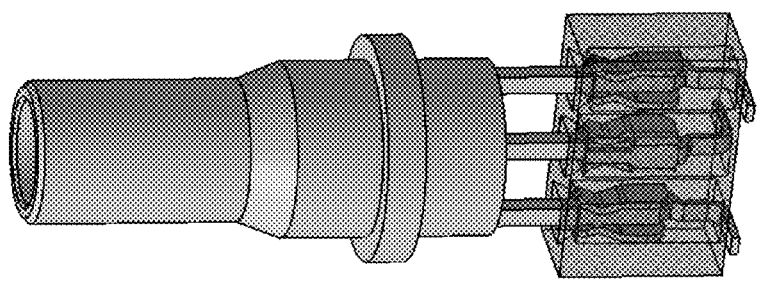
FIG. 12B
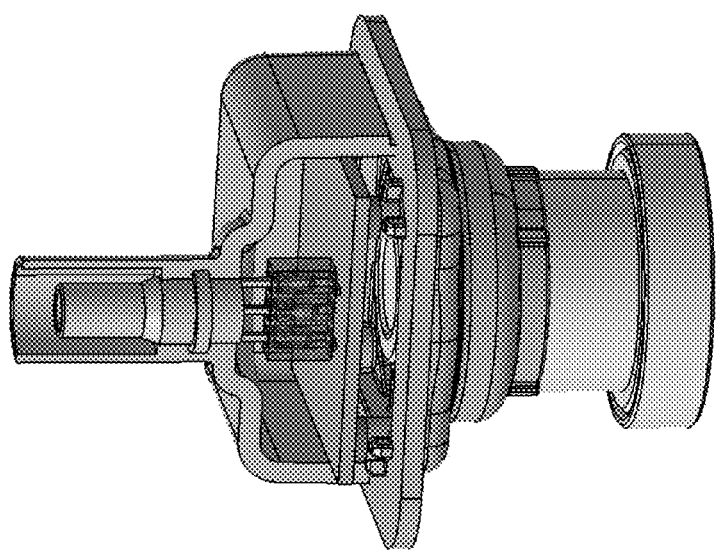
FIG. 12A

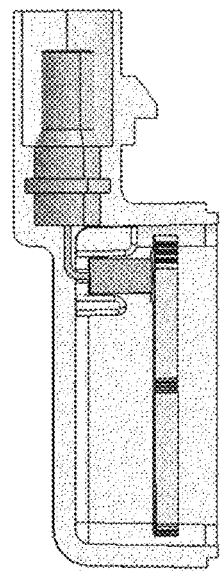
FIG. 15
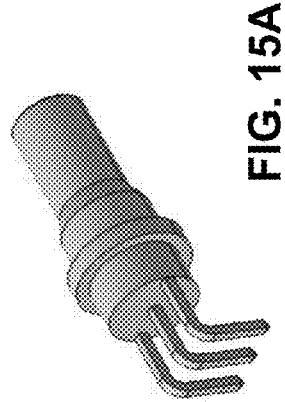
FIG. 15A
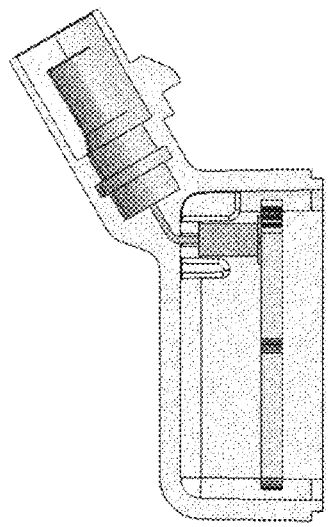
FIG. 14
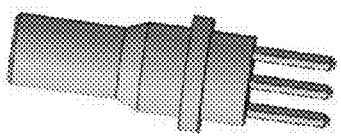
FIG. 14A
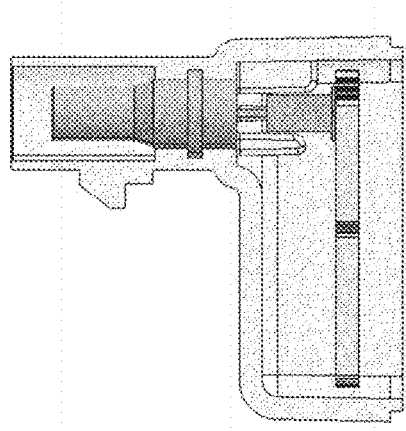
FIG. 13
FIG. 13A

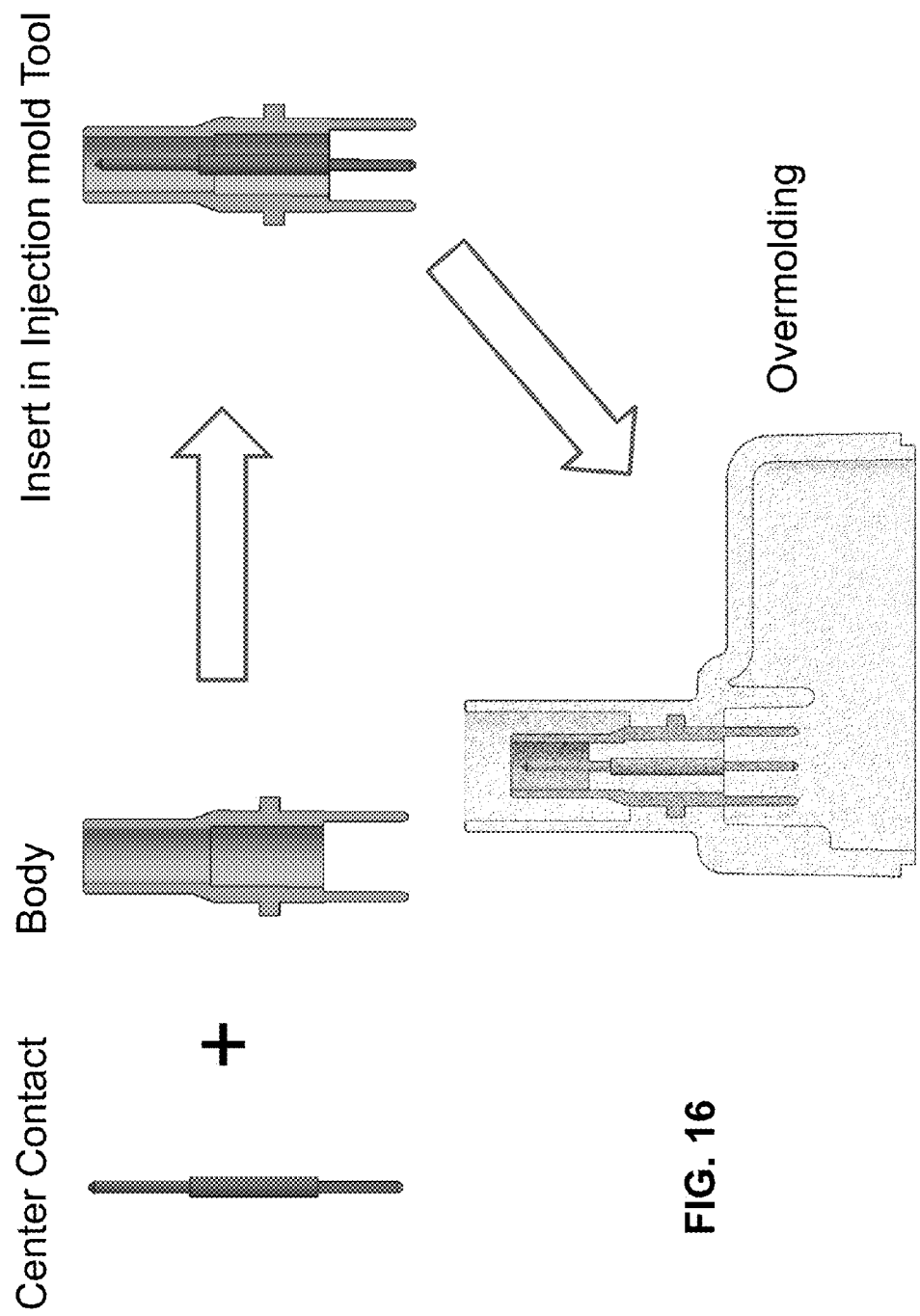

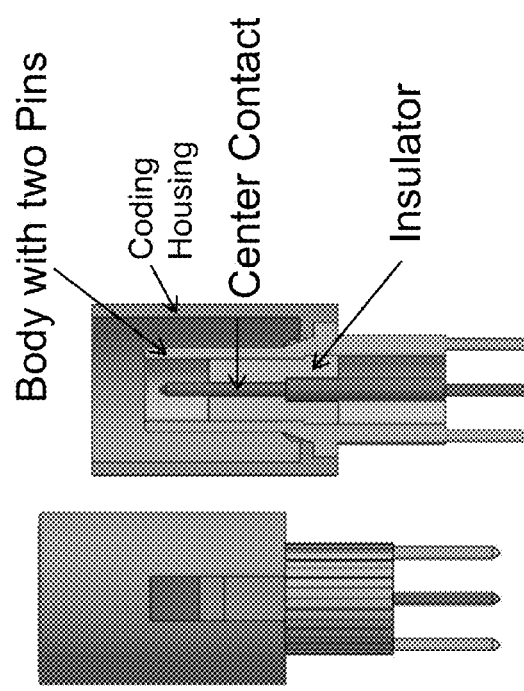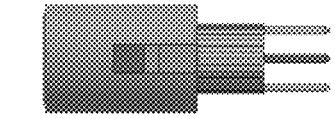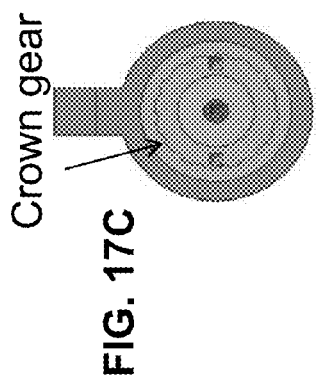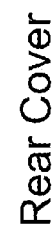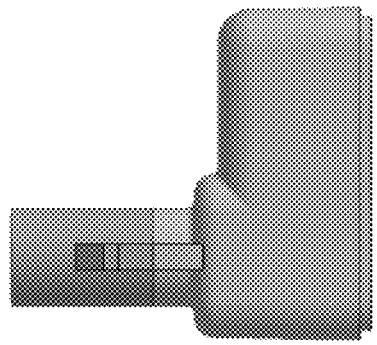

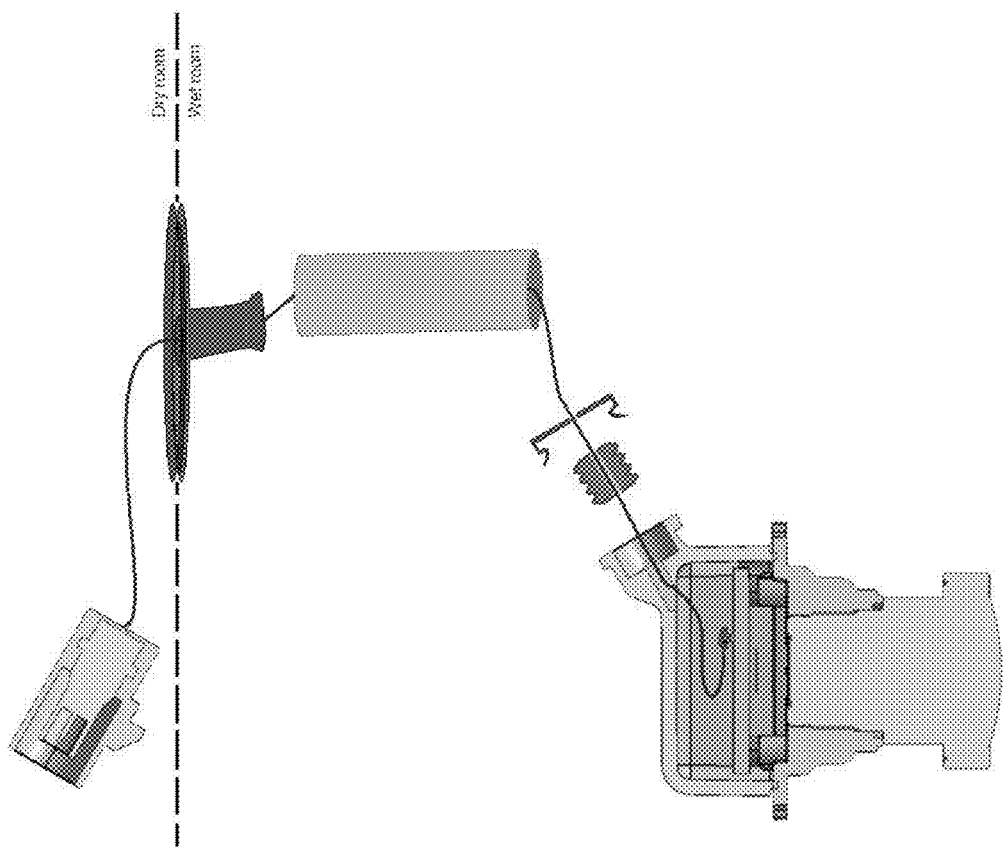

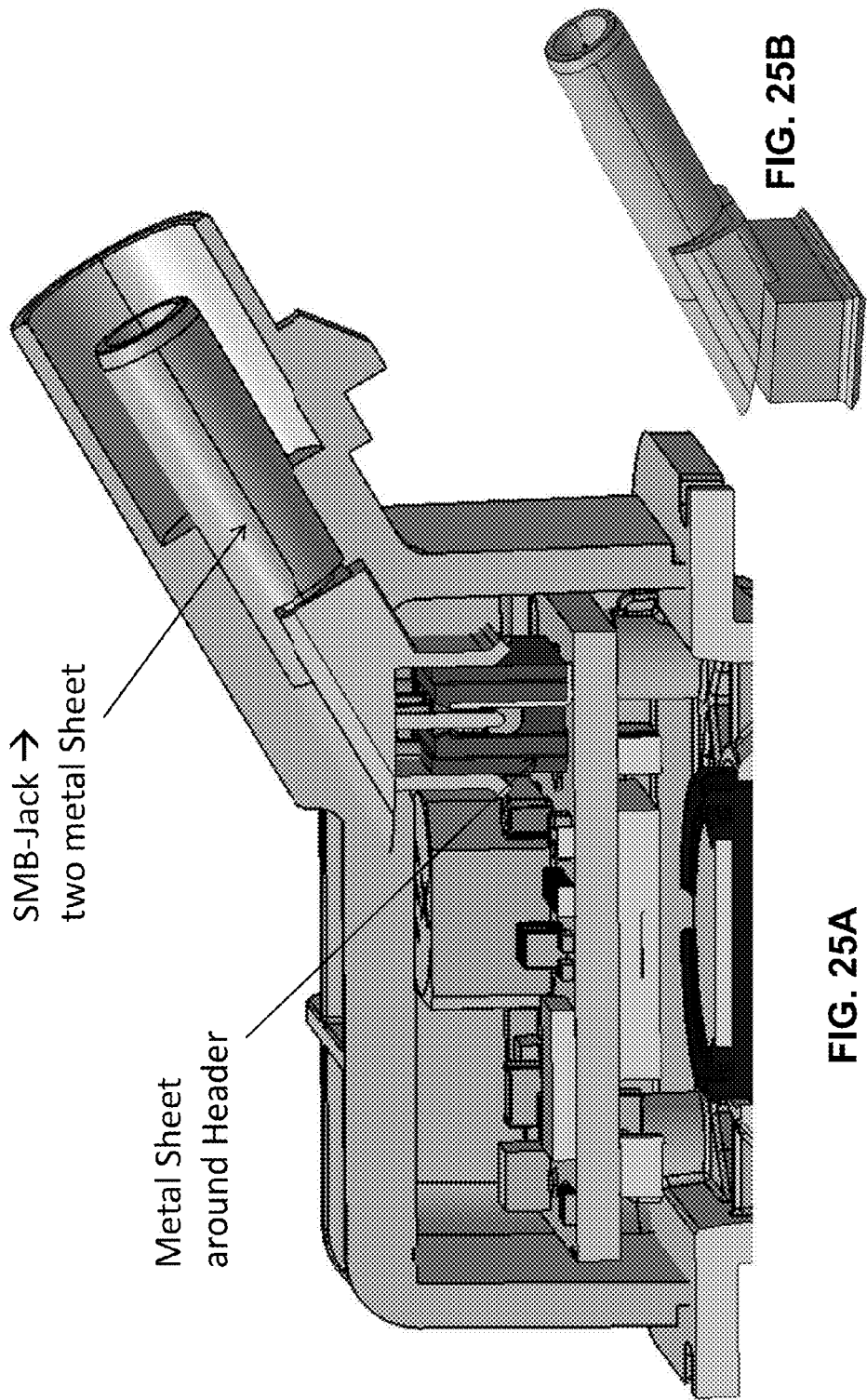

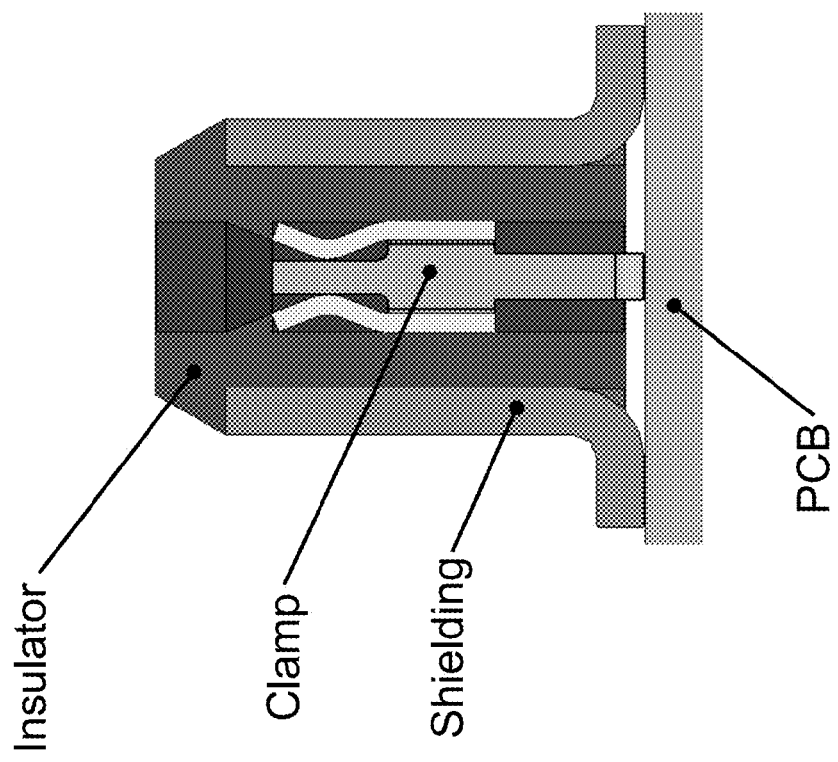
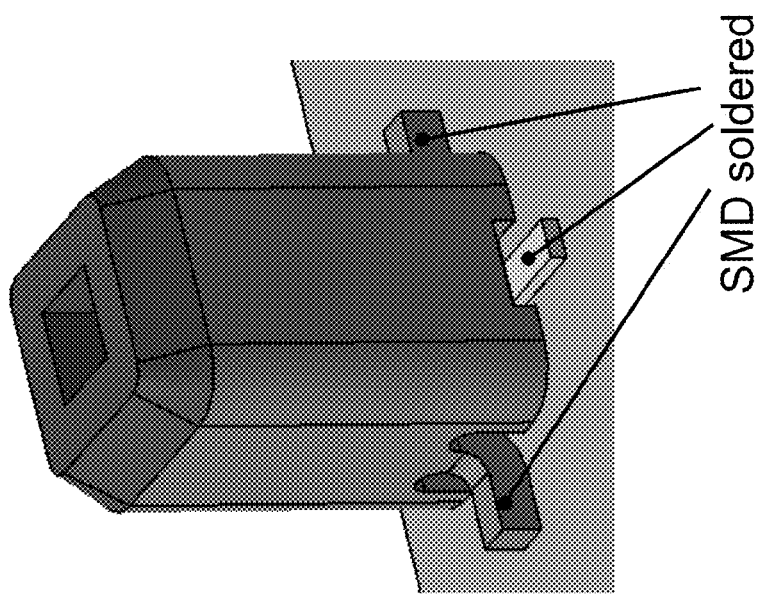
FIG. 29B
FIG. 29A

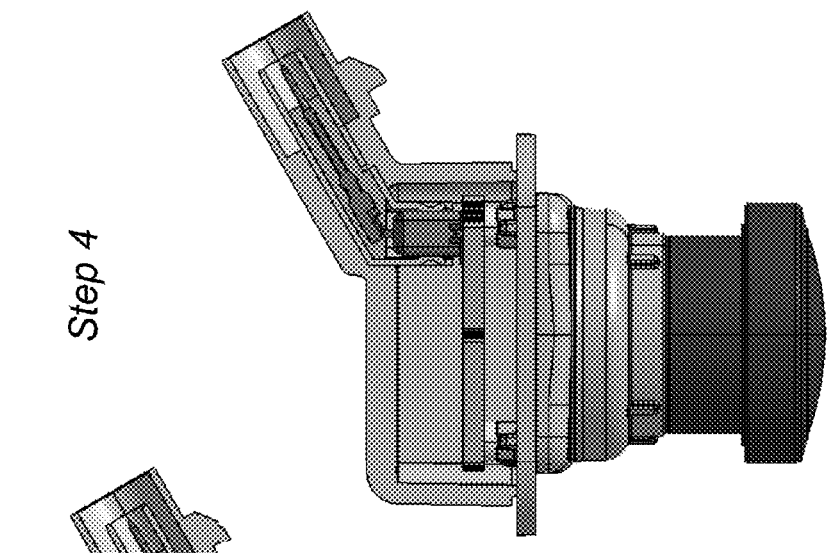
FIG. 31A  Step 1
FIG. 31B  Step 2
FIG. 31C  Step 4
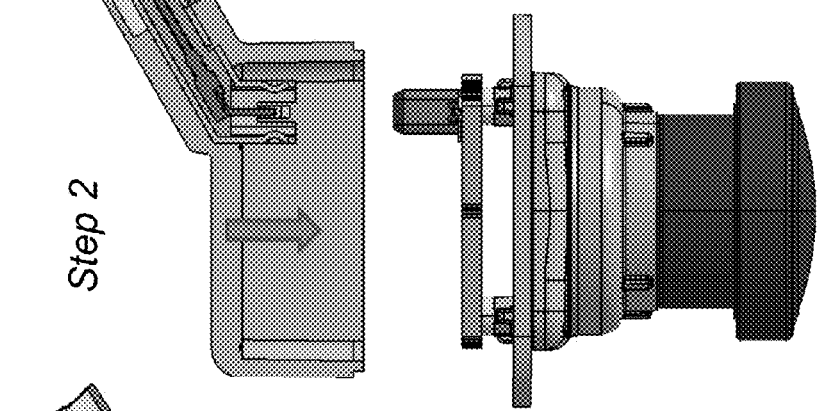
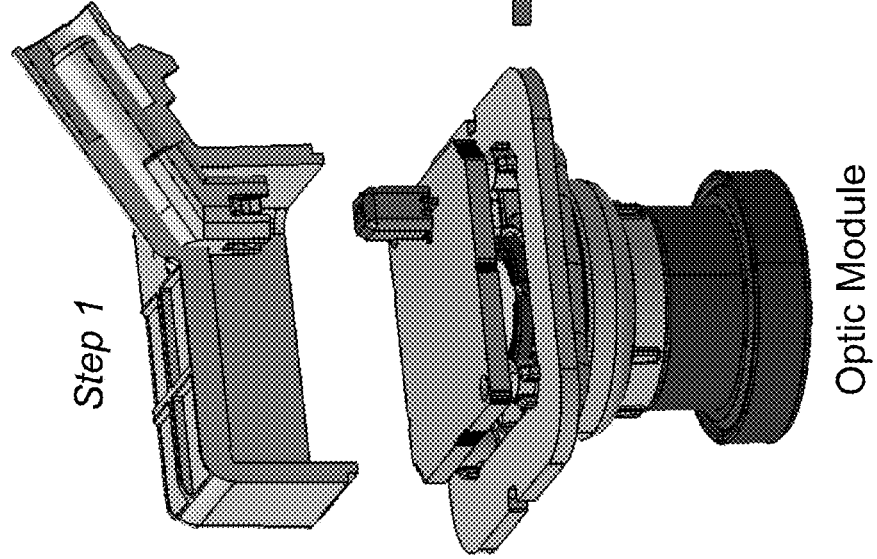
Optic Module

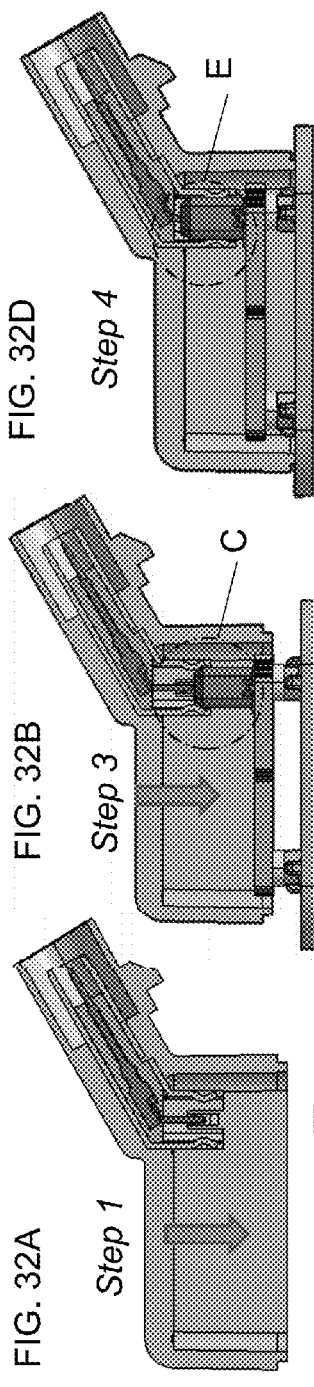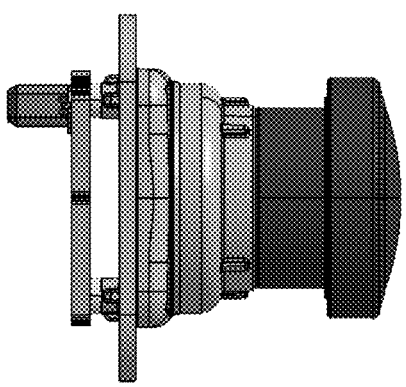

Y-parallel section
PCB rotated by 2 deg.

X-parallel section
PCB rotated by 2 deg.

Heat shrink harness housing

Mold Harness housing
Sealing by overmolding

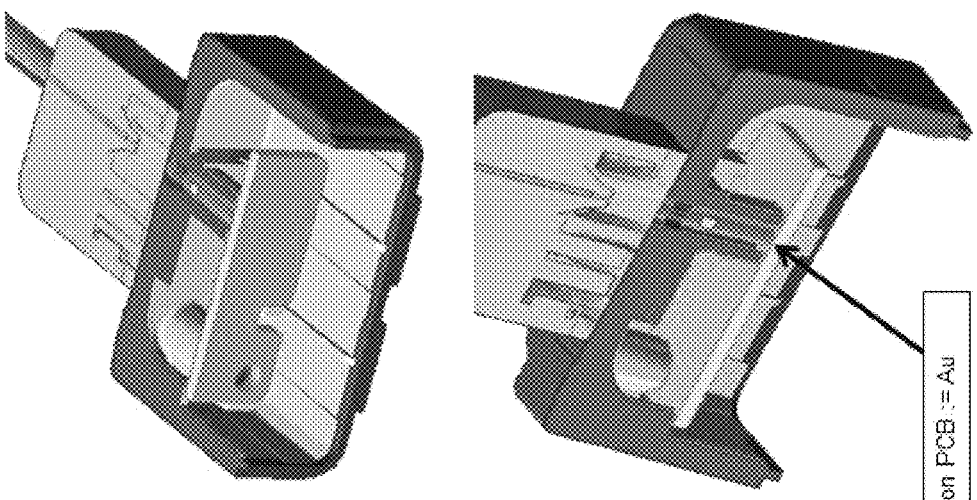
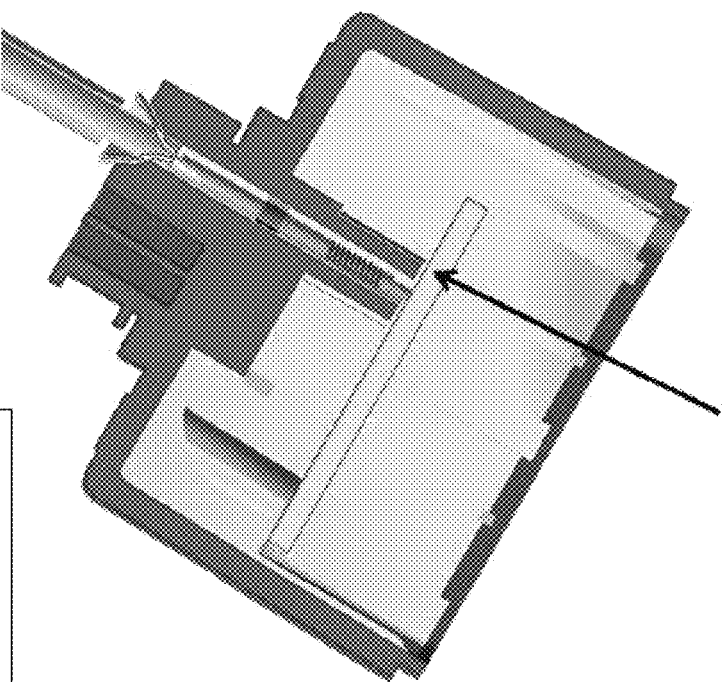
FIG. 39I

Coaxial parts directly assembled to main body

VEHICLE CAMERA HOUSING WITH TOLERANCE COMPENSATING CONNECTOR

CROSS REFERENCE TO RELATED APPLICATIONS

The present application claims the filing benefits of U.S. provisional applications, Ser. No. 62/093,741, filed Dec. 18, 2014; Ser. No. 62/090,157, filed Dec. 10, 2014; Ser. No. 62/074,905, filed Nov. 4, 2014; Ser. No. 62/054,505, filed Sep. 24, 2014; Ser. No. 62/035,614, filed Aug. 11, 2014; Ser. No. 62/032,661, filed Aug. 4, 2014; Ser. No. 62/027,463, filed Jul. 22, 2014, Ser. No. 62/018,868, filed Jun. 30, 2014, Ser. No. 62/003,734, filed May 28, 2014, Ser. No. 61/993,736, filed May 15, 2014, Ser. No. 61/950,261, filed Mar. 10, 2014, and Ser. No. 61/935,056, filed Feb. 3, 2014, which are hereby incorporated herein by reference in their entireties.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a camera for a vehicle vision system, with the camera providing enhanced electrical connection between terminals of a connector of the camera (that are electrically connected to a vehicle wiring or lead when the camera is mounted at a vehicle) and circuitry of a circuit element (such as a printed circuit board (PCB) or the like) within the housing of the camera.

According to an aspect of the present invention, a camera for a vehicle vision system includes a housing (which may comprise a first housing portion and a second housing portion, with the first housing portion having a lens holder for holding a lens thereat) having a connector portion for connecting to a vehicle wiring when the camera is installed at a vehicle. A circuit element is disposed within the housing, and a plurality of electrical connector elements are disposed at the connector portion of the housing. The electrical connector elements includes first ends that are configured for electrically connecting to circuitry of the circuit element and second ends that are configured for electrically connecting to the vehicle wiring. The electrical connector elements self-adjust to engage the circuitry and maintain engagement with the circuitry during assembly of the camera housing and during use of the camera on a vehicle.

The present invention provides for a connector that accommodates or copes with misalignment in the x and y positions, and the z position (height), and tilt and roll of pins that are statically fixed at the rear housing's structure against a PCB connector. The connector may cope with z-direction misalignments to provide enhanced electrical connection at the camera PCB. Optionally, the connector of the present invention provides a dry room solution that provides a water-tight seal at the connector to limit or substantially preclude water intrusion at the connector and/or camera housing.

Therefore, the present invention provides a vehicle vision system camera that has enhanced electrical connection between an electrical wiring or lead of the vehicle that connects to terminals or pins of a camera connector and to circuitry of an imager PCB or the like. The enhanced electrical connection is provided via an adjustable or self-adjusting electrical connector, such as a spring-loaded pin or connector or a flexible or resilient connector, with the connector elements self-adjusting or moving or flexing to maintain alignment and electrical connection between the connector portion of the camera housing and the circuitry of the imager PCB or other circuitry within the camera housing. The present invention thus enhances the manufacturing of the camera module (and assembling of the first and second housing portions together), such as by readily adjusting or adapting for tolerance variations and misalignments or slight misalignments of the housing portions and camera components, and provides enhanced electrical connection over the life time of the camera.

These and other objects, advantages, purposes and features of the present invention will become apparent upon review of the following specification in conjunction with the drawings.

BRIEF DESCRIPTION OF THE DRAWINGS

FIGS. 7A-D are views of a camera and connector configuration in accordance with the present invention;

FIGS. 12A-D are views of the camera and connector configuration as assembled in accordance with the present invention;

FIGS. 13 and 13A are views of an angled connector configuration of the present invention having a straight exit;

FIGS. 14 and 14A are views of an angled connector configuration of the present invention having an angled exit;

FIGS. 15 and 15A are views of an angled connector configuration of the present invention having a 90 degree angled exit;

FIG. 16 shows the components of a connector as assembled and with overmolded parts in accordance with the present invention;

FIGS. 17A-G show the components of a connector and the connector as assembled and with a press mounted connector in accordance with the present invention;

FIG. 18 is a view of another camera and connector configuration in accordance with the present invention, shown with a pig tail solution with micro connector and with bayonet fixation, pull relief, grommet, heat shrink tube and dry side harness connector;

FIG. 25A is a sectional view of an angled stamping-folding part with a shielding skirt;

FIG. 25B is a perspective view of the stamping-folding part of FIG. 25A;

FIGS. 29A and 29B are perspective and sectional views, respectively, of a SMD mounted PCB header or socket structure having an angle at the top outer edges flanges for easing the mating with the camera coaxial connector of FIG. 28;

FIGS. 31A-C are sectional views showing the steps of mating of the camera rear cover connector to the lens holder PCB header structure during assembly, showing the whole camera during the assembly steps;

FIGS. 32A-E are sectional views showing the mating of the camera rear cover connector to the lens holder PCB header structure during assembly, showing the partial and close up views during the assembly steps;

FIGS. 39A-K are views of another camera housing and connectors of the present invention;

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 1:
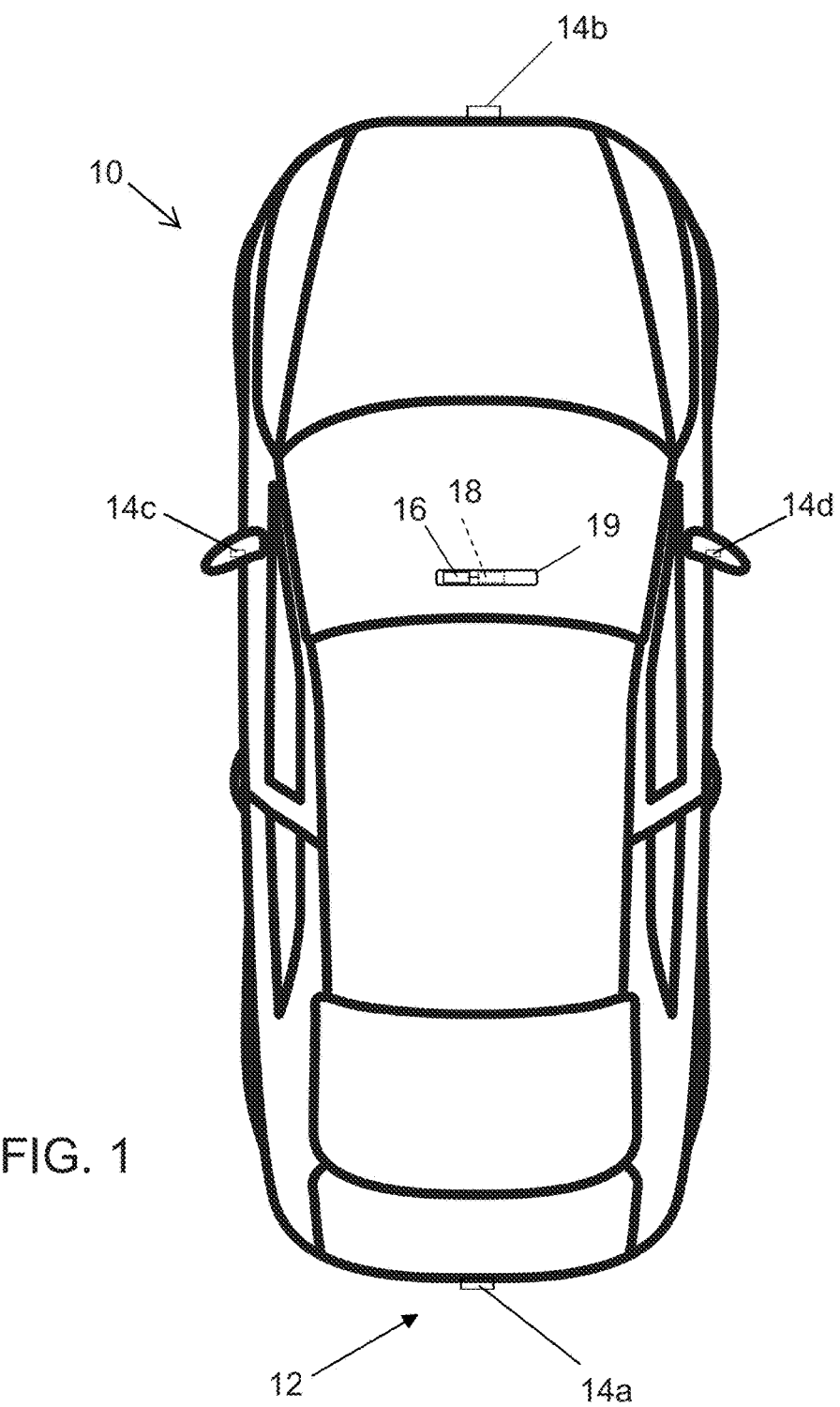
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). The vision system 12 includes a control or electronic control unit (ECU) or processor 18 that is operable to process image data captured by the cameras and may provide displayed images at a display device 16 for viewing by the driver of the vehicle (although shown in FIG. 1 as being part of or incorporated in or at an interior rearview mirror assembly 19 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle. The communication or signal may comprise a variety of signals, such as an Ethernet signal or the like.

The camera module and/or connectors may utilize aspects of the camera connectors described in U.S. patent application Ser. No. 13/785,099, filed Mar. 5, 2013, and/or International Publication No. WO 2010/091347, which are hereby incorporated herein by reference in their entireties.

From International Publication No. WO 2010/091347, incorporated above, a 'floating' rear cover may be fixated and the connector pins are inserted. Also, and as described in WO 2010/091347, elastic pins may be disposed between the PCB and the housing for coping with forces due to misaligning of the assembly. As described in U.S. patent application Ser. No. 13/785,099, incorporated above, telescoping pins may be provided for coping with the misalignment of PCBs to the imager PCB of cameras with more than one PCB, such as by elastic/flexible pins, telescopic pins or with flexible wiring inside the camera (see FIG. 2, which is new and inventive according the invention) for connecting camera coaxial connectors mounted at the camera body to a camera PCB. Optionally, a PCB connector may be provided on a flexible piece of wiring which spreads outward at the camera housing as a pig tail (such as disclosed in U.S. patent application Ser. No. 13/785,099, and see FIG. 18, which shows a flexible wiring connector utilizing aspects of the present invention).

For coping with the misalignment of a camera connector incorporated or attached or a part of the camera's rear end body in x, y, and z dimensions, such as a coaxial connector to a camera PCB, there may be mating pin slots in use which allow connector pins as part of the camera rear connector structure to connect properly, also when the insertion depths is in a specific band of tolerance of highs (see FIGS. 7A-D, 8A-C, 9A, 9B, 10, 10A, 11, 11A, 11B and 35-38). Misalignment sideward may be coped with by elasticity (see FIGS. 10, 10A, 11, 11A, 11B, 12A-D, 13, 13A, 14, 14A, 15 and 15A) or by the design of the pins (see FIGS. 7A-D and 8A-C). For example, the pins may be spring-loaded pins (as discussed below) or the pins or receiving portions at the circuit element may flex or otherwise adjust to accommodate misalignment of the connector elements and the circuitry or mating connector during assembly of the camera. The electrical coaxial connector elements thus may adjust so that the pins or ends engage the circuitry and make electrical connection therewith without applying forces from the housing portion that holds the connector elements (the rear housing of the camera) to the circuitry of the circuit element within the front housing portion sufficient to impair operation of the circuitry and/or camera.

For serving the need of having different camera connector exit directions, the camera may have different angled connector angles. FIGS. 13, 13A, 14, 14A, 15 and 15A show variants of different angled connector exits. The misaligning coping pin-slot interface is applied in the camera connections of FIGS. 13, 13A, 14, 14A, 15 and 15A. The angled connectors may be designed in a way that the PCB design and orientation may stay the same in all variants of exit angles. Because three pins are not highly symmetrical, the EMC performance of the pin area is not optimally shielded. Optionally, there may be a bell like structure circumferentially around the center pin and incorporated to the pins (such as a known Amphenol coaxial connector without Z component flexibility).

Figure 19:
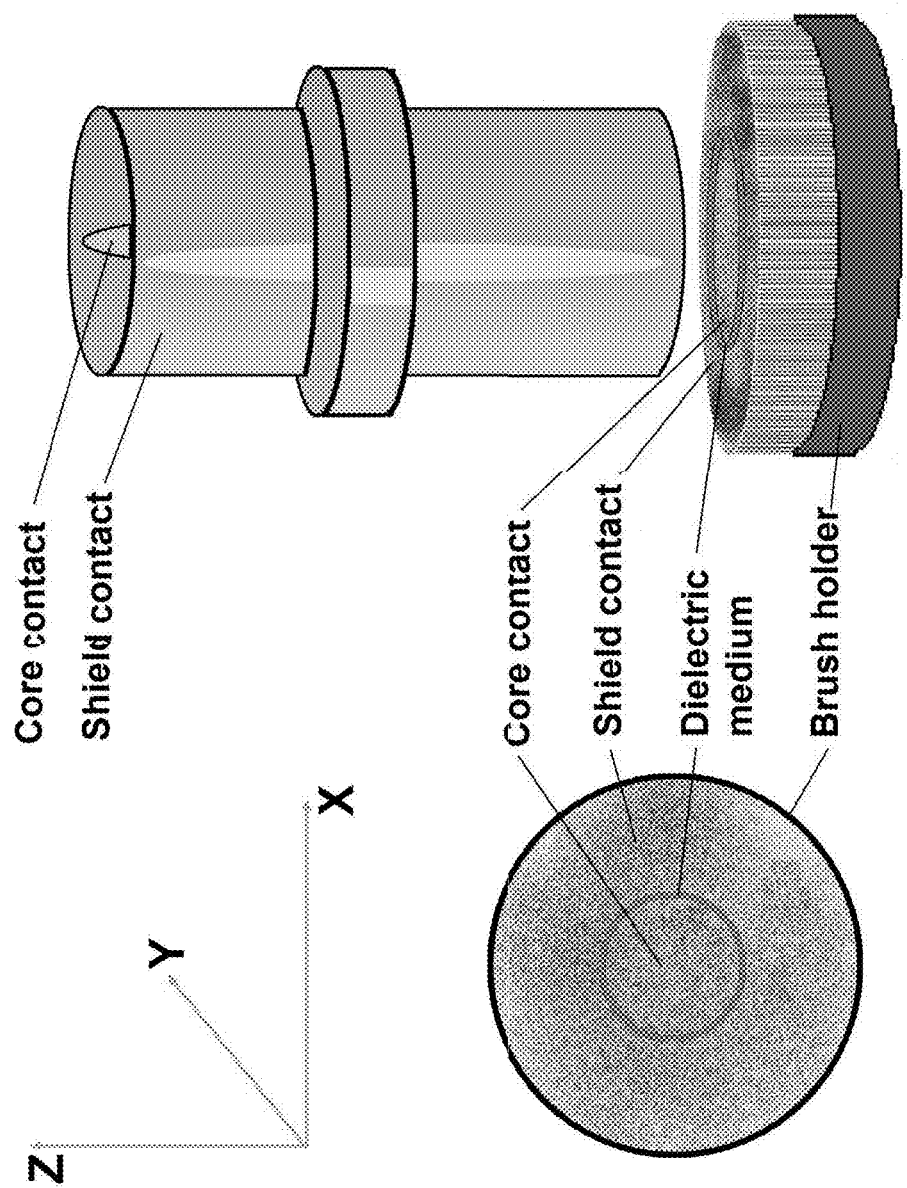
FIG. 19 is a view of non-angled or straight connector configuration of the present invention, showing a connector interface comprised by a split brush with a core contact brush structure and a shield contact brush structure divided or separated by an insulator or a dielectric foil applied in the brush holder.

Optionally, and in accordance with the present invention, a connector interface (such as for an SMD component) may be used which comprise a twin brush with a core contact brush structure and a shield contact brush structure divided or separated by a dielectric medium (See FIG. 19). Brush structures are known in industrial cable assembly applications for improving the shield contacting. For example, a known connector from SKINTOP®, with the connector having a circumferential metal brush for contacting a coaxial cable shield in an orthogonal direction. In contrast to the known SKINTOP® connector, the connector of the present invention contacts a solid coaxial structure and contacts the shield from the front end side. The connector of the present invention contacts a coaxial cable inner core by a second brush structure or a combined brush structure, having an inner core brush contact and an outer shield brush contact divided or separated by a dielectric medium (such as a generally circular or ring-shaped insulator or dielectric medium or layer or film disposed circumferentially around the inner core brush contact and inboard of the outer shield brush contact).

The brush's material may comprise any conducting fiber or wires or the like (such as a plurality of wires). The wires or fibers may comprise any type of conducting polymer, carbon, brass, aluminum, steel, bronze, copper or their alloys, and may be finished with a zinc or tin surface. A preferred material is carbon, since carbon fibers (carbon nano tubes) may be made very thin, and the conducting properties of carbon are good and the production of the connectors using carbon is lower cost than some other materials. Another preferred material may be fibers of silver since these are well producible, highly electrically conductive and non-corrosive. Optionally, the dielectric medium may comprise a material with a low relative permittivity $\varepsilon_r$ (by its material's nature or properties) (low-k-dielectric), see formula 1 below.

$$\varepsilon = \varepsilon_r * \varepsilon_0 = D/E \qquad (1)$$

The insulator or dielectric medium may comprise any suitable material. For example, the dielectric medium may comprise a foil (such as polyethylene or the like), such as shown in FIG. 19, or may comprise a foam (such as polystyrol), a gel or dispension (such as polyacryl acid), a granulate out of a ceramic or a silicate (such as a mica or the like, such as, for example, Muscovite), a polymid (such as PAE), a metal oxide (such as Aluminum oxide or the like) or half metal oxide or dioxide (such as silizium dioxide or the like), a paper, a wax, wood, a gas, air or vacuum (vacuum may be achieved by vacuumizing the whole camera volume).

Figure 20:
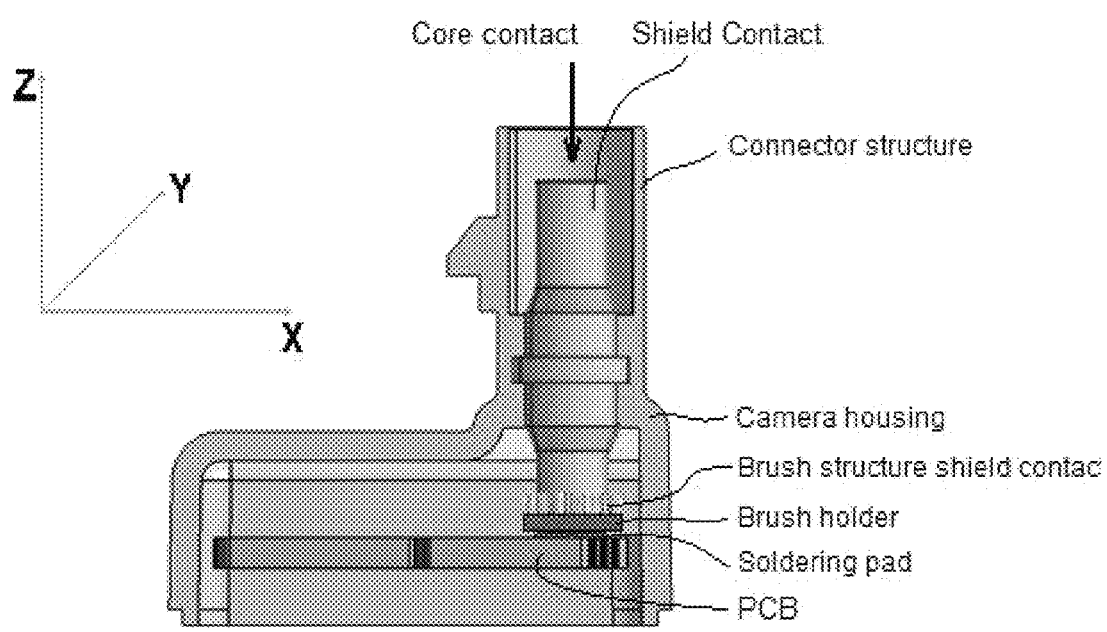
FIG. 20 is a cross sectional view of a camera housing's rear body, showing the brush connector structure of FIG. 19 of the present invention applied directly onto the camera PCB by SMD solder pads.
Figure 21:
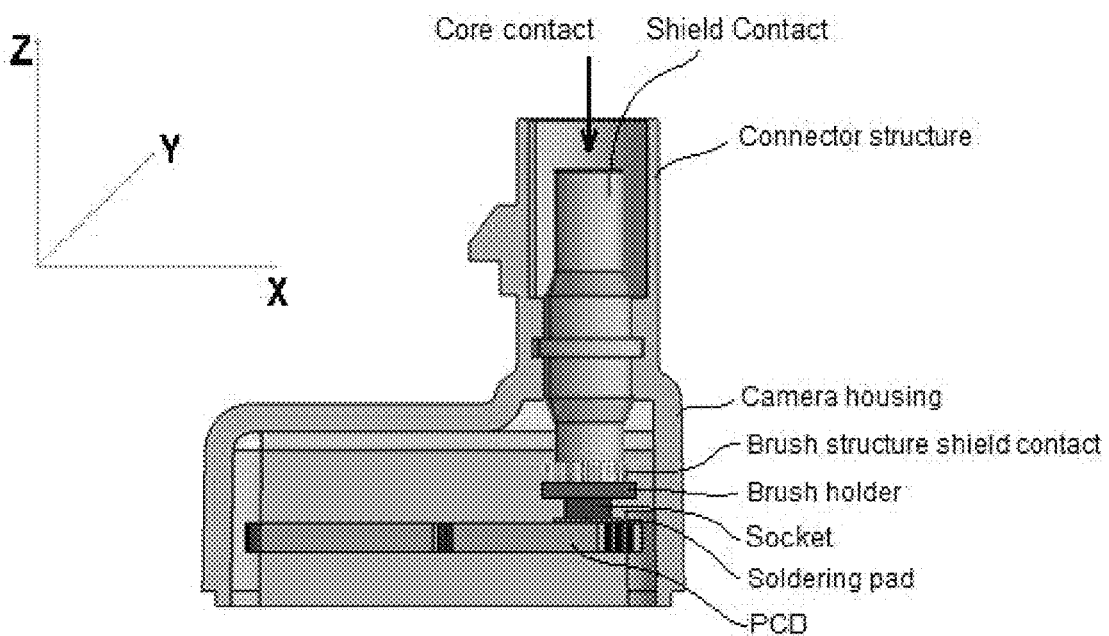
FIG. 21 is another cross sectional view of a camera housing's rear body showing the brush connector structure from FIG. 19 of the present invention applied at a socket of a camera PCB.

The brushes or combined brushes may be held by one or two brush holders. The brush holder(s) may have a SMD contact on its lower or bottom side for soldering it directly to a PCB, such as shown in FIG. 20. As an alternative option, the brush holder(s) may have a socket for being plugged into a pin assembly on a PCB or as another alternative may have a pin structure on its lower or bottom end for being plugged into a socket structure mounted on a PCB (possibly by SMD), such as shown in FIG. 21.

Optionally, and preferably, the pin assembly may be arranged in a symmetrical manner for enhanced EMC performance. The brush structure may be assembled in a round shape or an at least substantially round shape for enhanced or optimal EMC performance (and the connector may include shielding that shields from the likes of EMC interference). When assembling a camera rear housing holding a solid coaxial connector structure (such as can be seen with reference to FIGS. 20 and 21), with the brush structure mounted on the PCB, the solid contacts of the solid coaxial connector structure are pressed into and dive into the brush's fibers, and by doing that, close both of the nodes of the coaxial contact or connection.

FIGS. 13, 13A and 16 show a straight exit connector with an insert molding inlay part, which serves as coaxial connector with Fakra interface, together with the outside molding structure and as mating pins to the camera PCB to the inside (fixedly mounted, no elasticity). FIG. 16 shows a variant of a connector in which the injection mold also serves as a dielectric and fixation of the coaxial core pin. FIGS. 17A-G show a similar connector that has a similar dielectric but the connector body is not insert molded but press fit mounted. The press fit may be done from the inside to outside or from the outside to the inside.

Either the press fit or molding part may be angled for angled exits. That may be done in a way so that the camera rear body molding structure may be substantially similar or identical. As shown in FIGS. 17A-G, the coaxial connector interface variants may be achieved by another molding part applied when the connector variant is chosen. By that, costly molding tool variants can kept as less as possible. The tightening or securing may be done by gluing, welding, or by putting a heat shrink tube over the connection or the like.

Optionally, and according to another aspect of the present invention, when applying a pig tail solution with connecting a connector, such as a coaxial connector, directly onto the PCB, which is meant to reach from the wet room where the camera is mounted to the dry room where the wire harness (such as, for example, a door wire harness) is, there may be a shrinking tube reaching from a grommet (separating the dry from the wet room) to the camera rear end, by that a water tight interconnector can be left away such as can be seen with reference to FIG. 18. For enabling (or electrically connecting the camera at the vehicle), the (coaxial) PCB is accessible from outside and the connector applicable the camera housing may have a window to reach through. The window may be closed by a lid of its size. It may have fixation clips and circumferential sealing. Alternatively, the rear cover of the camera may be closed after the PCB plug is applied.

Figure 2:
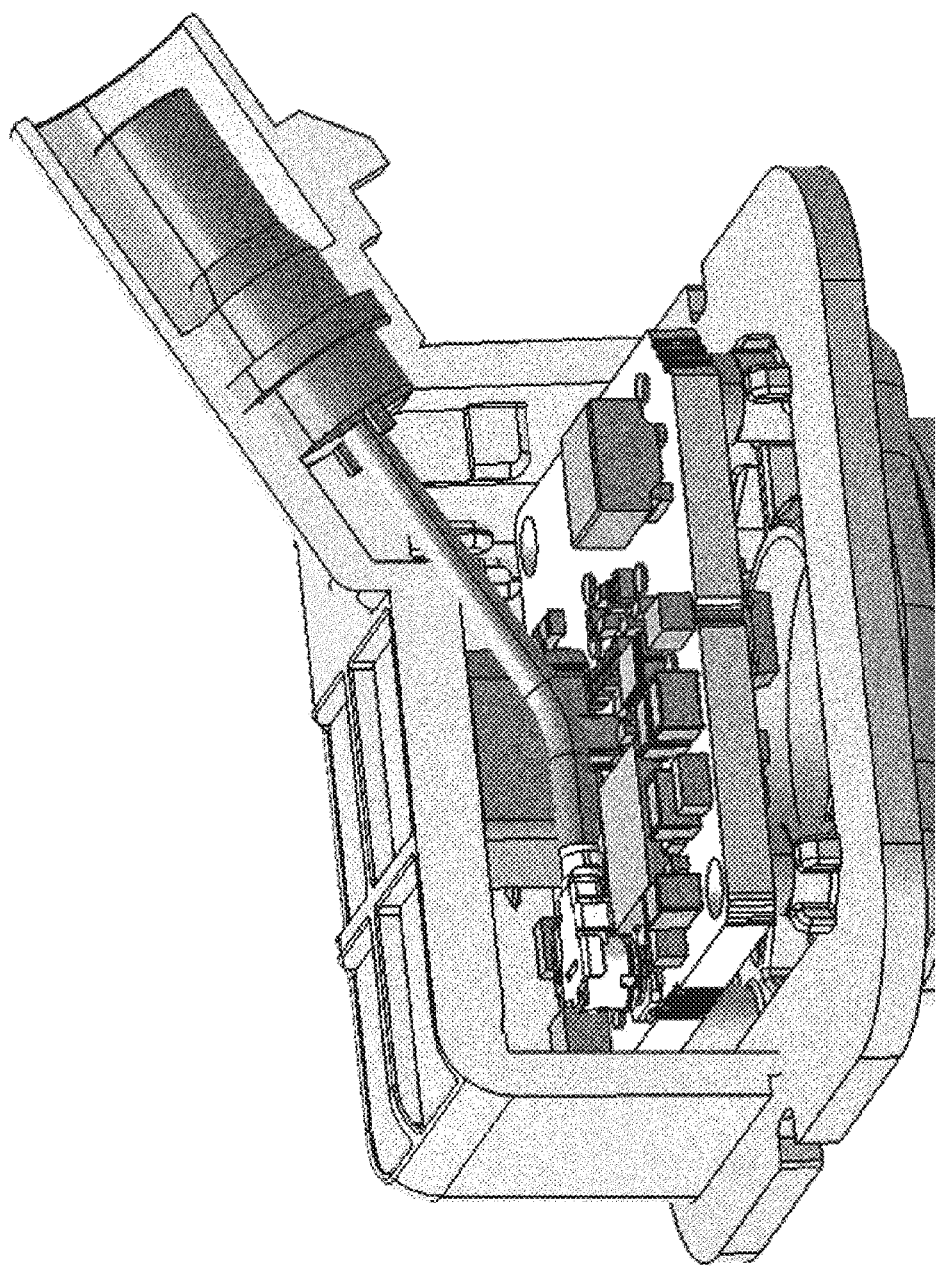
FIG. 2 is a perspective view of a pig tail solution connector with a coaxial cable and PCB plug molded and assembled, without continuing the cable outside of the connector.
Figure 3:
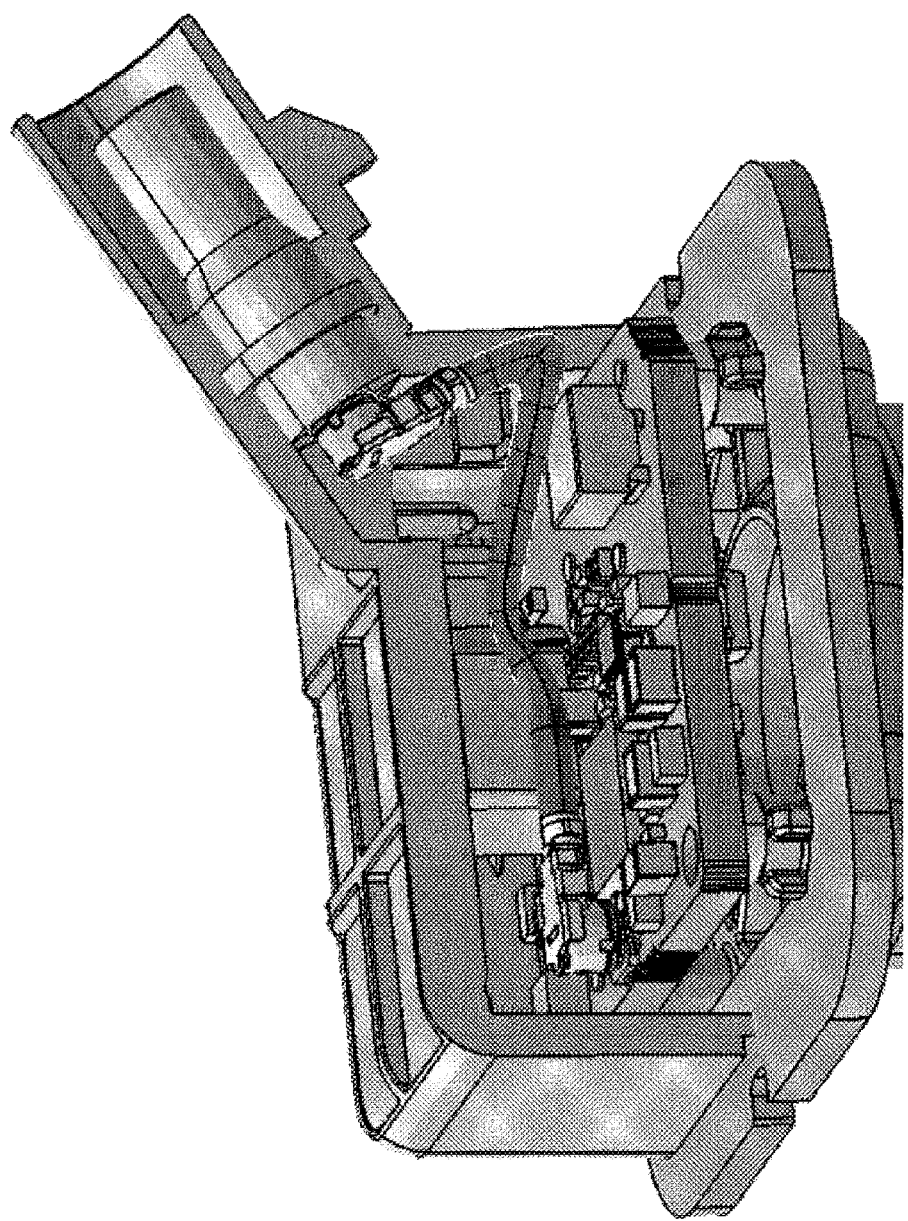
FIG. 3 is a perspective view of a connector for connecting the molded coaxial connector by using of a micro coax plug-to-plug cable in accordance with the present invention.

Optionally, the coaxial connector or mini coaxial connector (such as shown on FIG. 18) attaching the PCB may have a fixation structure as like a bayonet locking (such as shown on FIG. 18) or a bracket or clamp (such as known from automotive door harness plugs or personal computer plug fixations on the motherboard). The coaxial connector structures incorporated to the camera rear housing may be interconnected by a flexible cable which is connected by an insulation displacement (partially cutting and clamping) contacting at the housing side and with a mini coaxial connector at the PCB side. As shown in FIG. 2, an alternative is shown with the connector on the housing side molded in. As another option, the connector on the housing side may have a socket to interconnect the PCB such as shown in FIG. 3 under use of a plug-to-plug cable (such as using a plug-to-plug cable from MOLEX® with micro coaxial connector plugs (Nr. 73412-0280)). The housing connector has a mini coax jack at its end for receiving the mini coax connector plug.

For the use in a camera in accordance with the suggested connecting solutions in FIGS. 2, 3, 5 and 18, the used coaxial cable may comply with the requirements shown below in Table 1.

TABLE 1

Cable length: 150 mm . . . 300 mm typically
Data rate: between 2 GBit/s and 5 GBit/s
System impedance: 50 Ohm with a tolerance: +−10%
Torsion capability within 30 mm length and plugged connector: 45 degrees C.
Total insertion loss target: <0.5 dB <2.5 GHz
Total insertion loss target: <0.7 dB <6 GHz
Total DC resistance (each signal): <100 mR
DC current capability: >400 mA
Usability up to 42 V
All parameters shall include mating cycles and lifetime (10 years).

Figure 4:
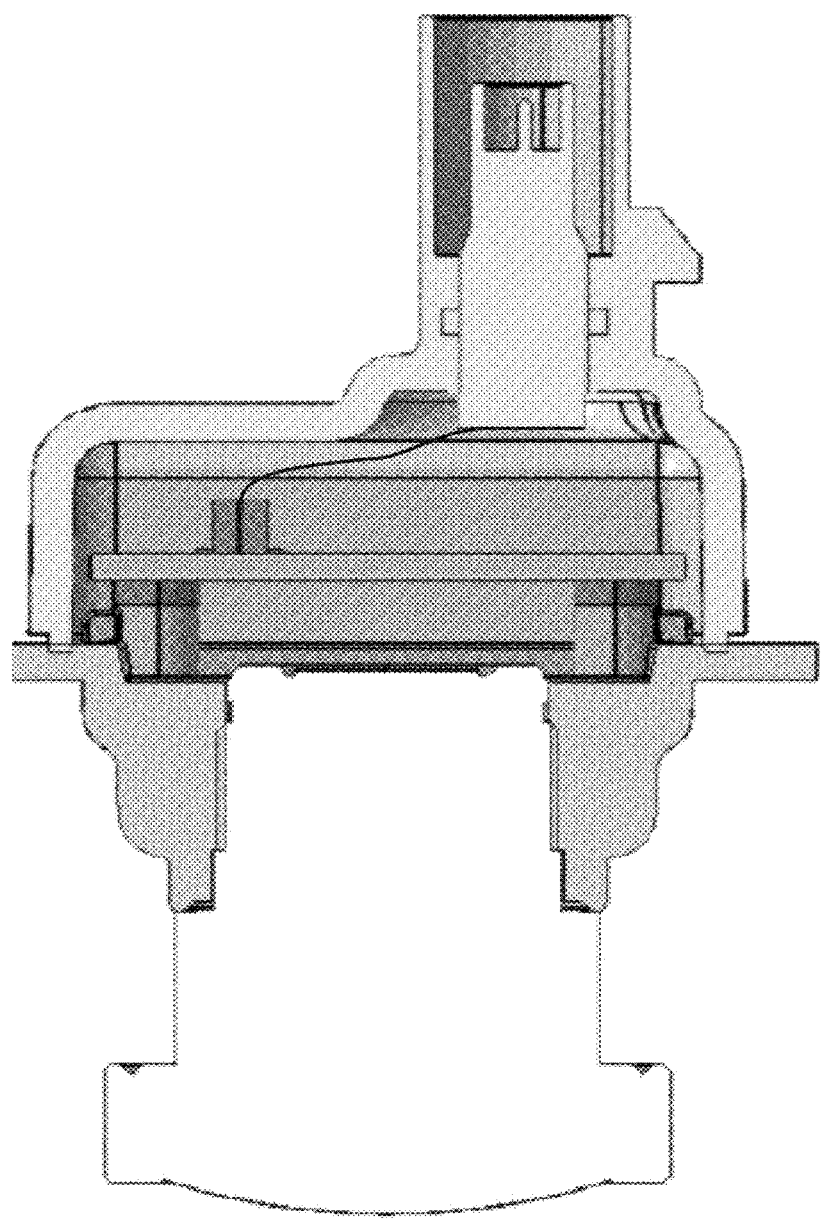
FIG. 4 is a sectional view of a housing molded coaxial connector attached to the PCB via a flexible PCB with coaxial structured layers (which gets inserted to a SMD socket on the PCB)
Figure 5:
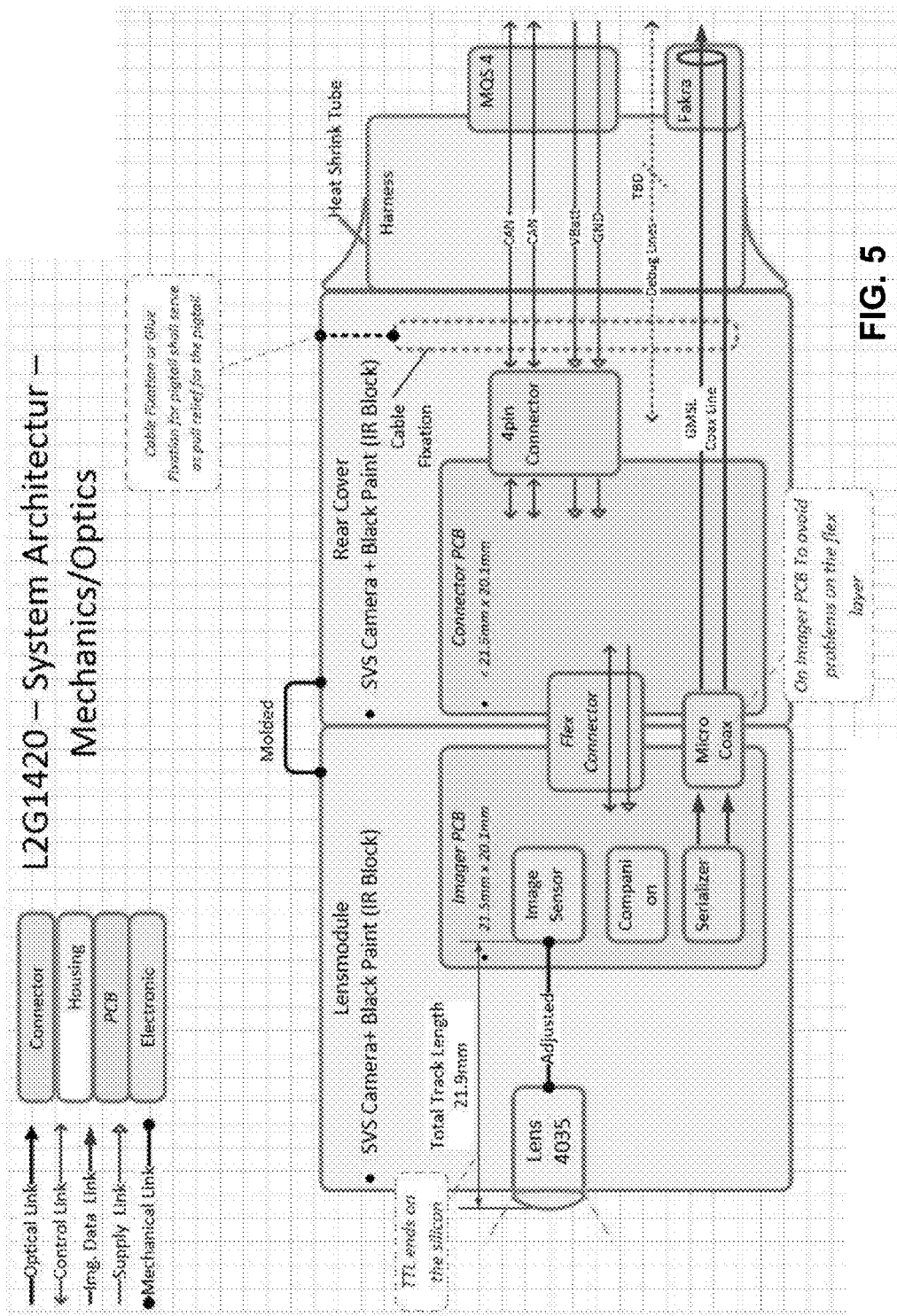
FIG. 5 is a block diagram showing the connector interfaces of a camera with an imager PCB and a connector PCB, with one connection connecting a molded coaxial connector and micro coax plug cable and another connection connecting to a four pin connector.
Figures 6A, 6B, 6C:
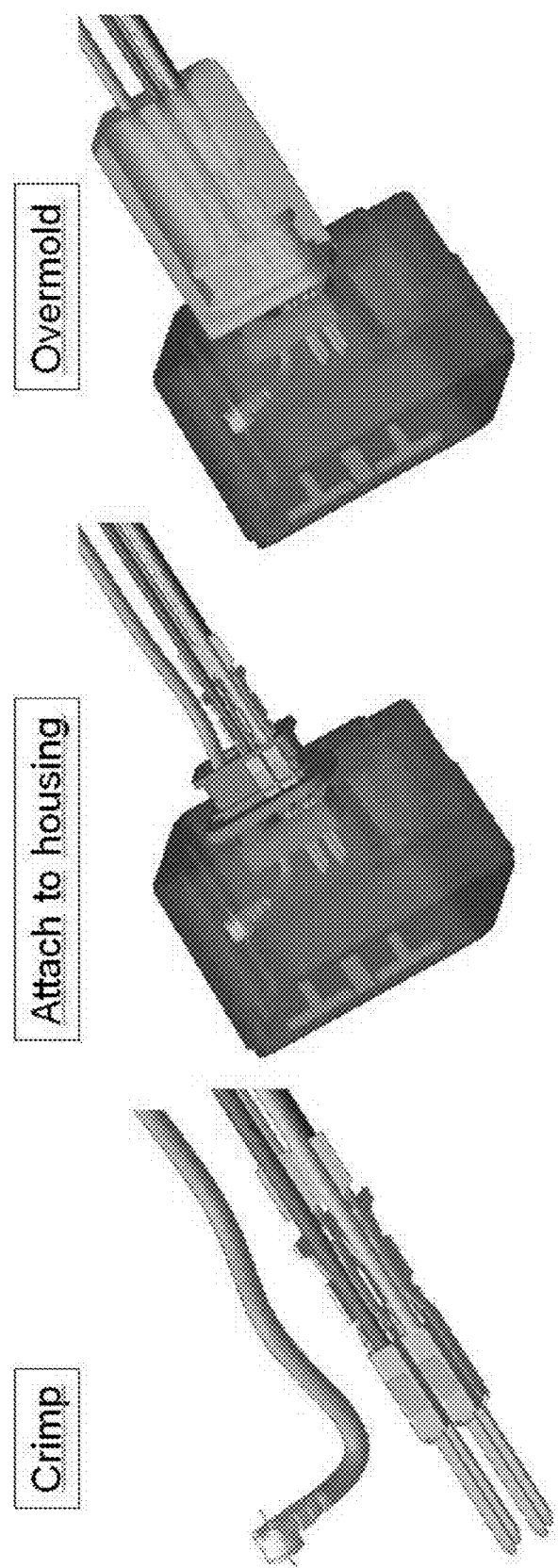
FIGS. 6A-C are views showing an example of how the interface connectors from FIG. 5 may be implemented, shown with the leads (FIG. 6A) attached to a housing (FIG. 6B) and with the housing overmolded (FIG. 6C) at the leads.
Figure 8C:
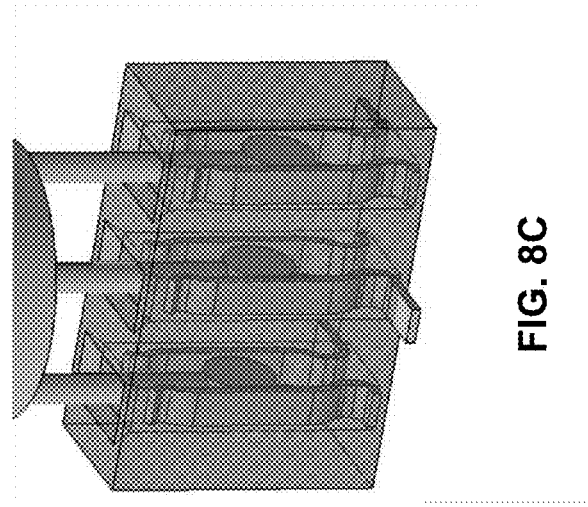
FIGS. 8A-C are views of another camera and connector configuration in accordance with the present invention.
Figure 8B:
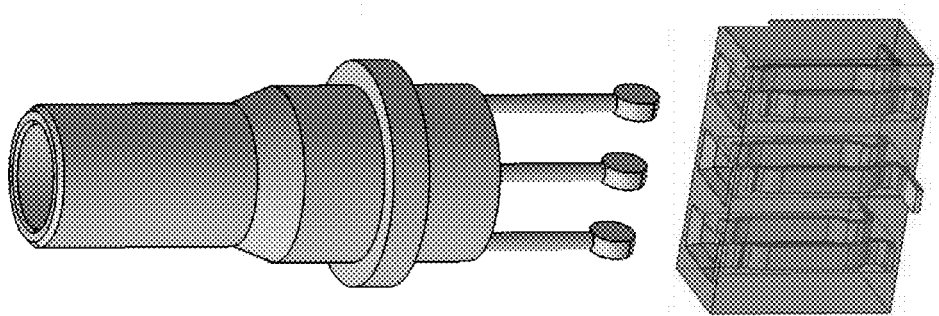
Figure 8A:
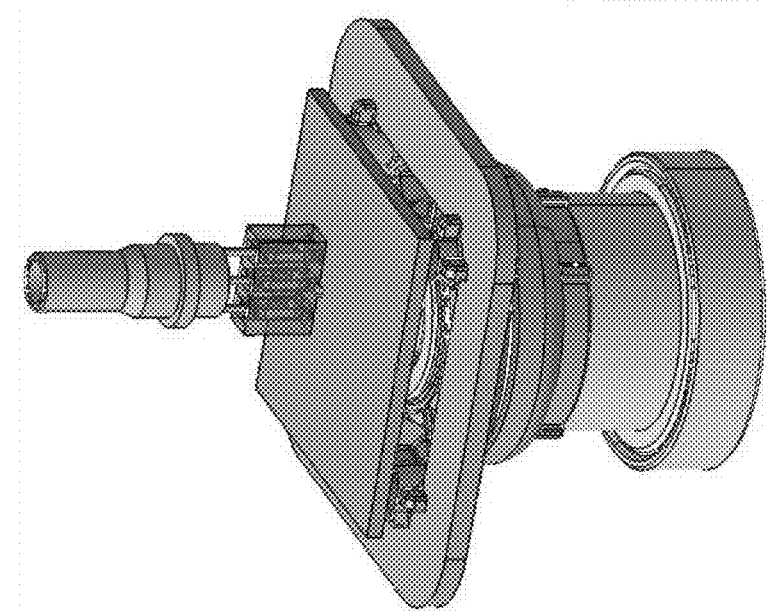
Figure 9B:
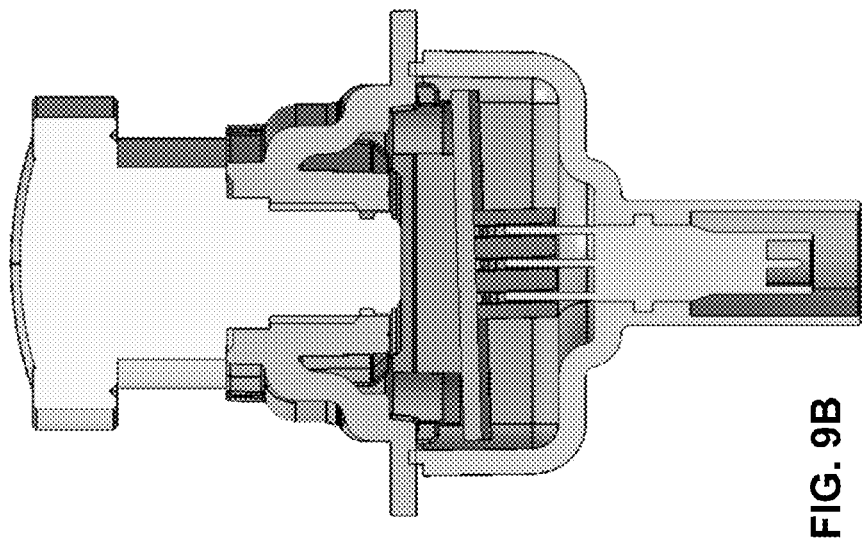
FIGS. 9A-B are side elevations and partial sectional views of a camera and connector configuration in accordance with the present invention, shown with the PCB rotated about two degrees relative to the x and y axes.
Figure 9A:
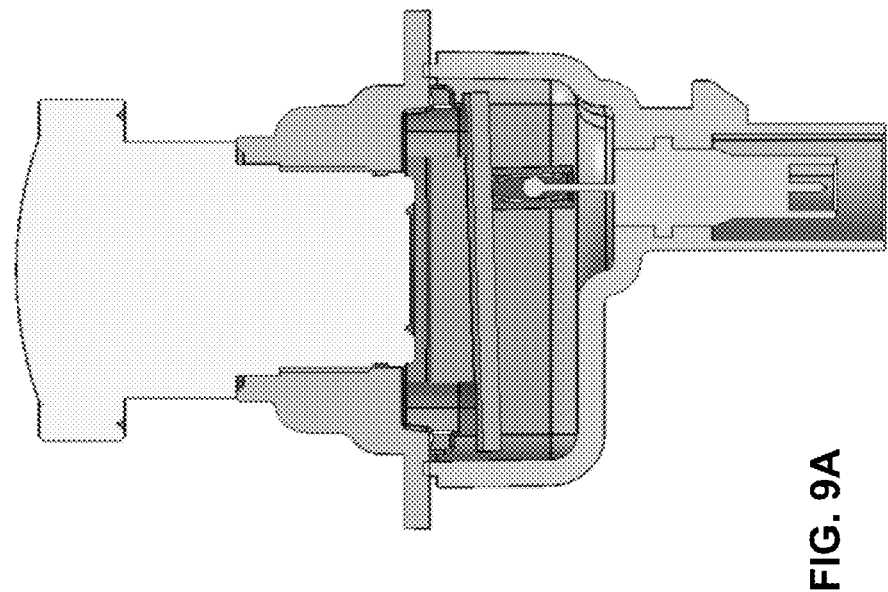
Figure 10A:
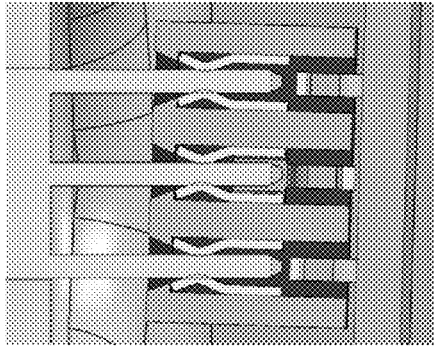
FIG. 10A is an enlarged view of the area A of FIG. 10.
Figure 11B:
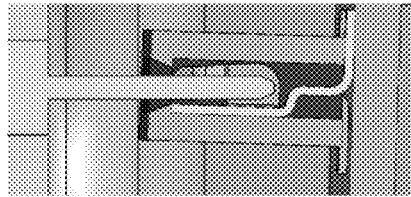
FIGS. 11A-B are enlarged views of the area A of FIG. 11.
Figure 11A:
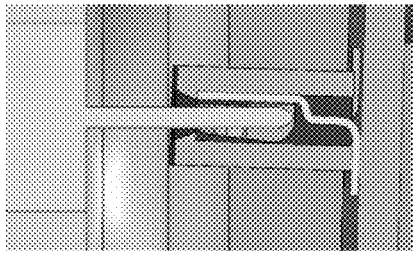
Figure 10:
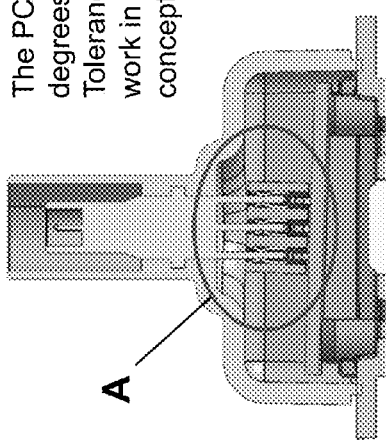
FIG. 10 is a side view showing the assembly with the tilting of the PCB.
Figure 11:
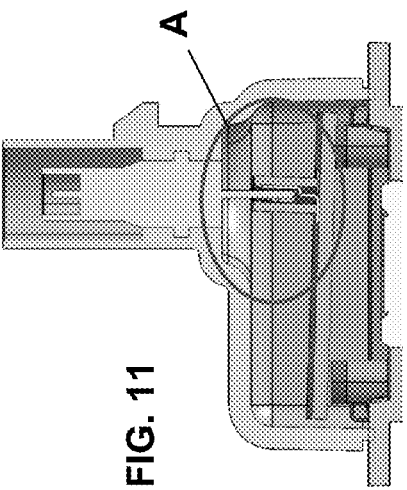
FIG. 11 is another side view showing the assembly with the tilting of the PCB.

As another optional construction, and such as shown in FIG. 4, the housing molded coaxial connector may be attached to the PCB via a flexible PCB with coaxial structured layers (such as rigid-flex, starrflex, semiflex or smart flex) which gets inserted to a SMD socket on the PCB. As shown in the block diagram of FIG. 5, one coaxial connection is connecting a molded coaxial connector with the imager PCB direct bypassing the connector PCB by use of a micro coax plug-to-plug cable in accordance with the present invention, while another connector with four wires is connected via a four pin connector interface to the connector PCB, which itself is connected via a flex wire to the imager PCB. This configuration avoids that the video signal has to pass the flex wire cable which would cause signal attenuation.

Figure 22:
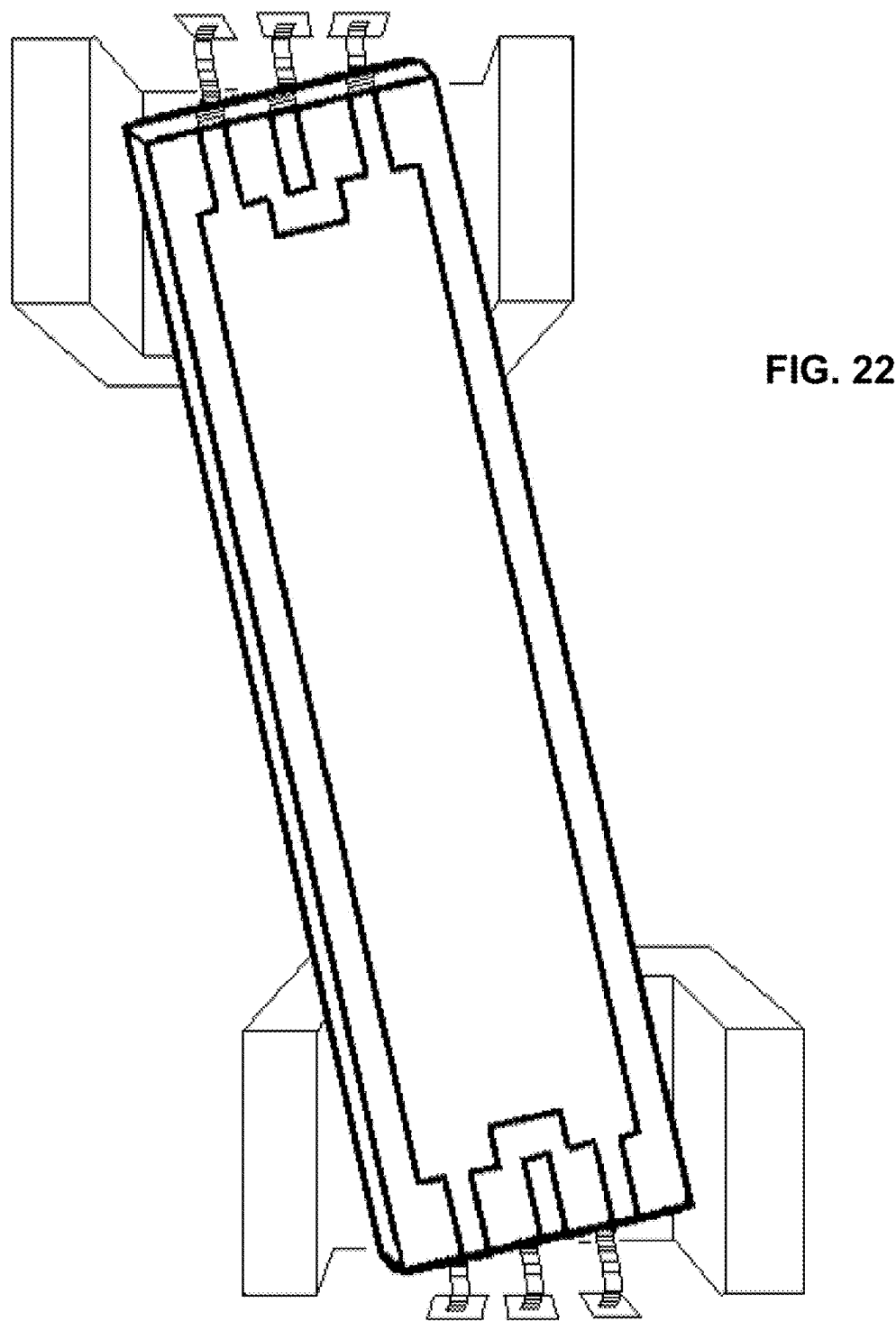
FIG. 22 is a connector for electrically connecting circuitry of a camera.
Figure 23:
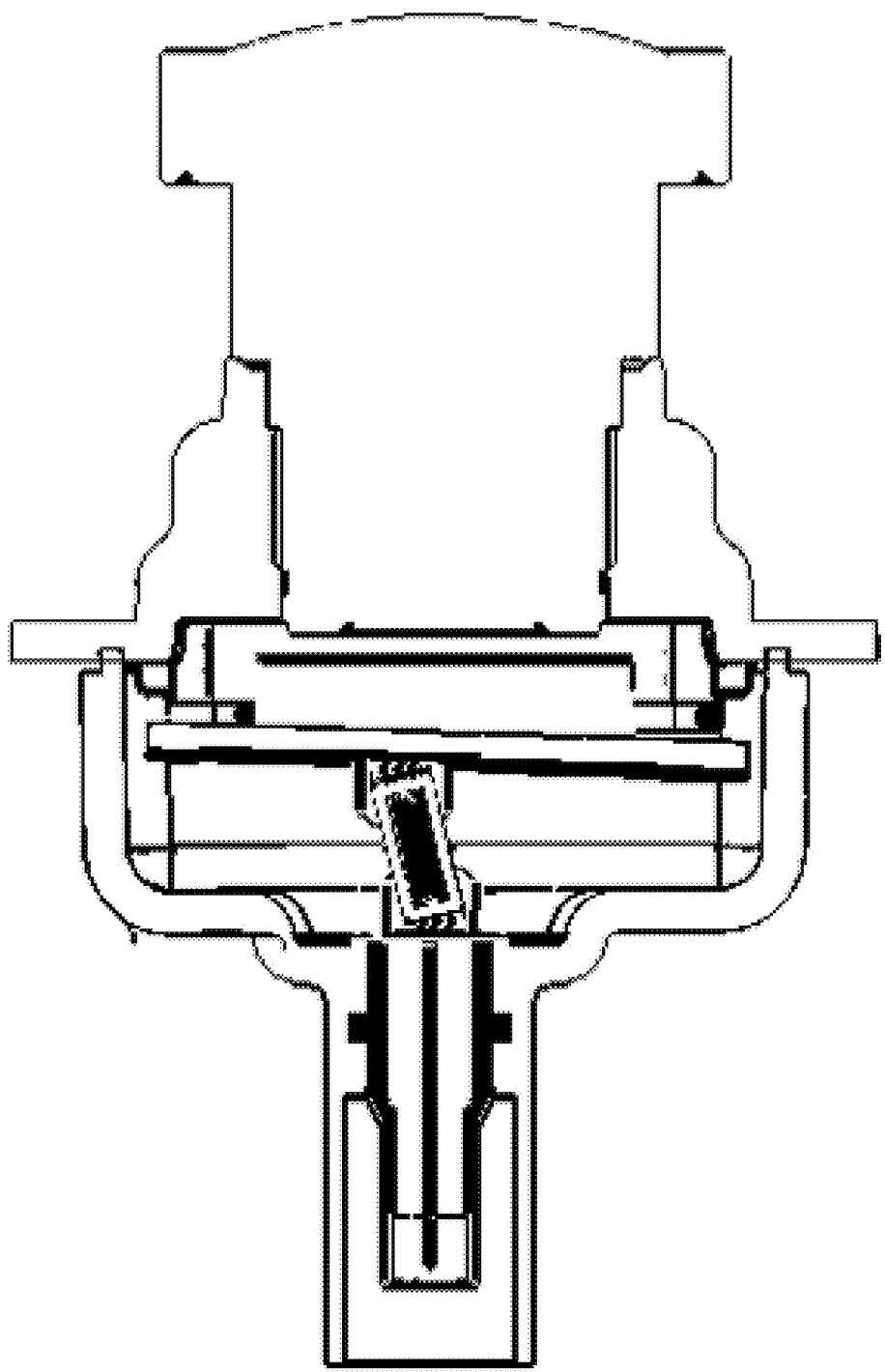
FIG. 23 is a sectional view of a camera, with the connector of FIG. 22 connecting the electrical terminals to circuitry at the circuit board.
Figure 24B:
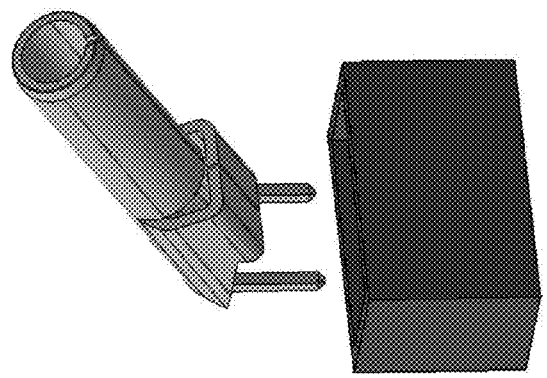
FIGS. 24A-C are views of an angled stamping-folding part with a shielding skirt.
Figure 24C:
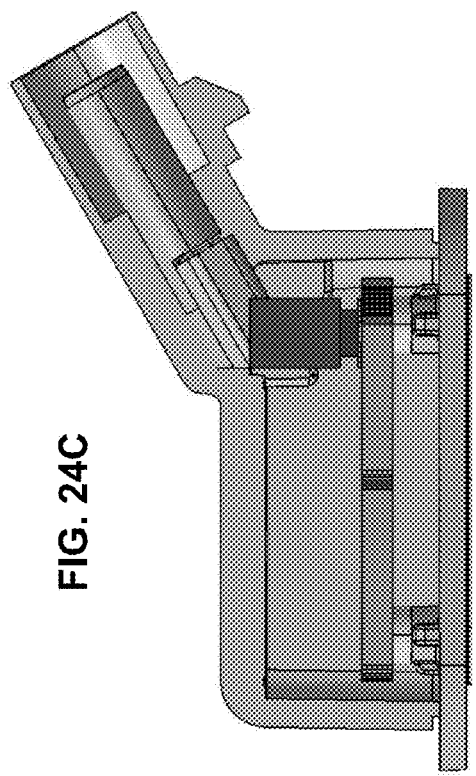
Figure 24A:
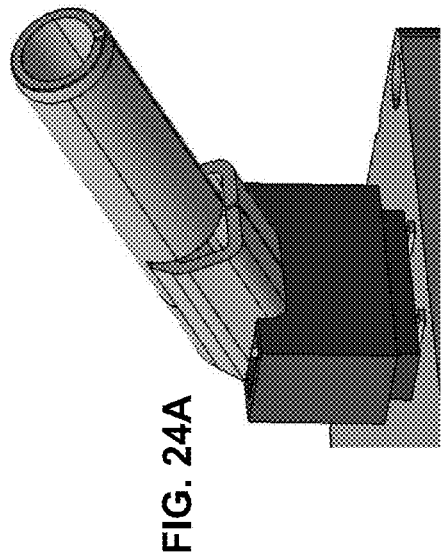
Figure 26B:
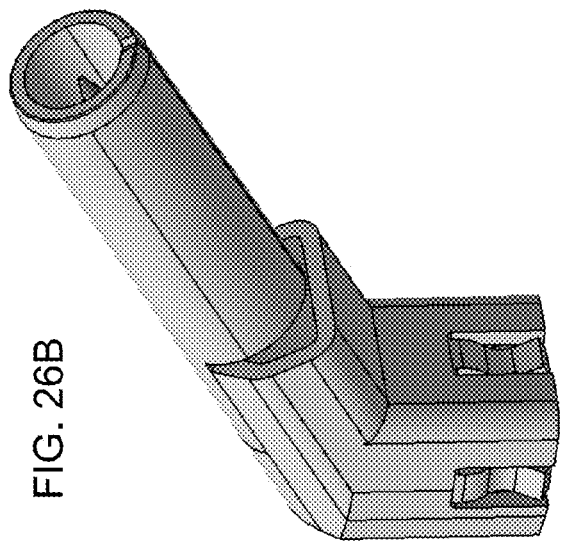
FIGS. 26A, B and C are perspective views on a stamping printing part camera rear housing coaxial connector structure for insertion molding, with the squared shape end being for mating a substantially square shaped SMD header, and with one conductive core pin and a shield structure, shown with spring like decoupled elastically portions in the shield structure squared end which bend inwards to narrow the diameter, and shown with a dielectric medium that insulates the core pin from the shield.
Figure 26C:
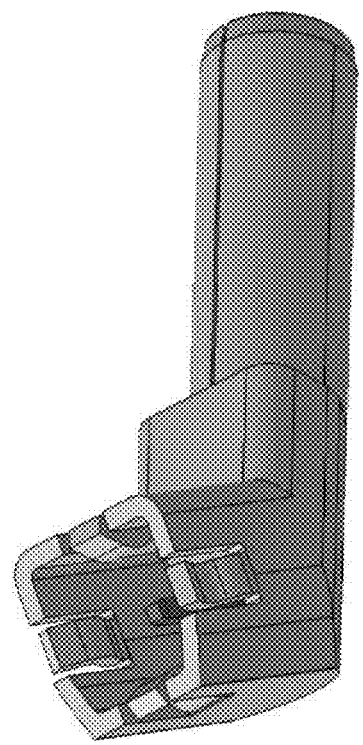
Figure 26A:
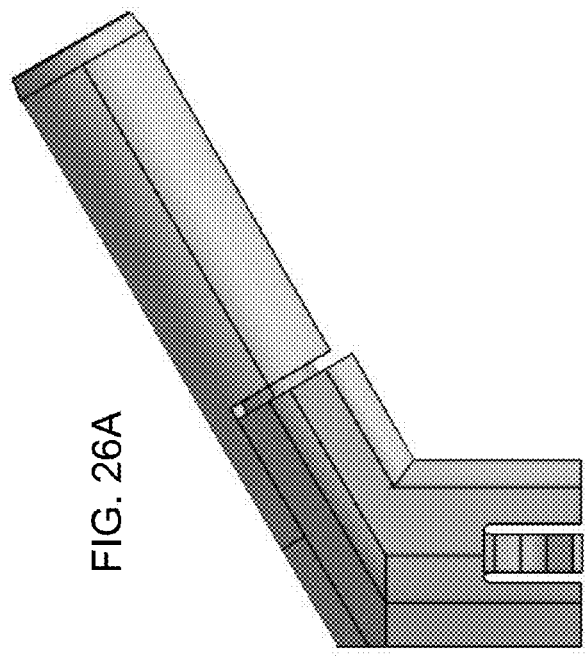
Figure 27:
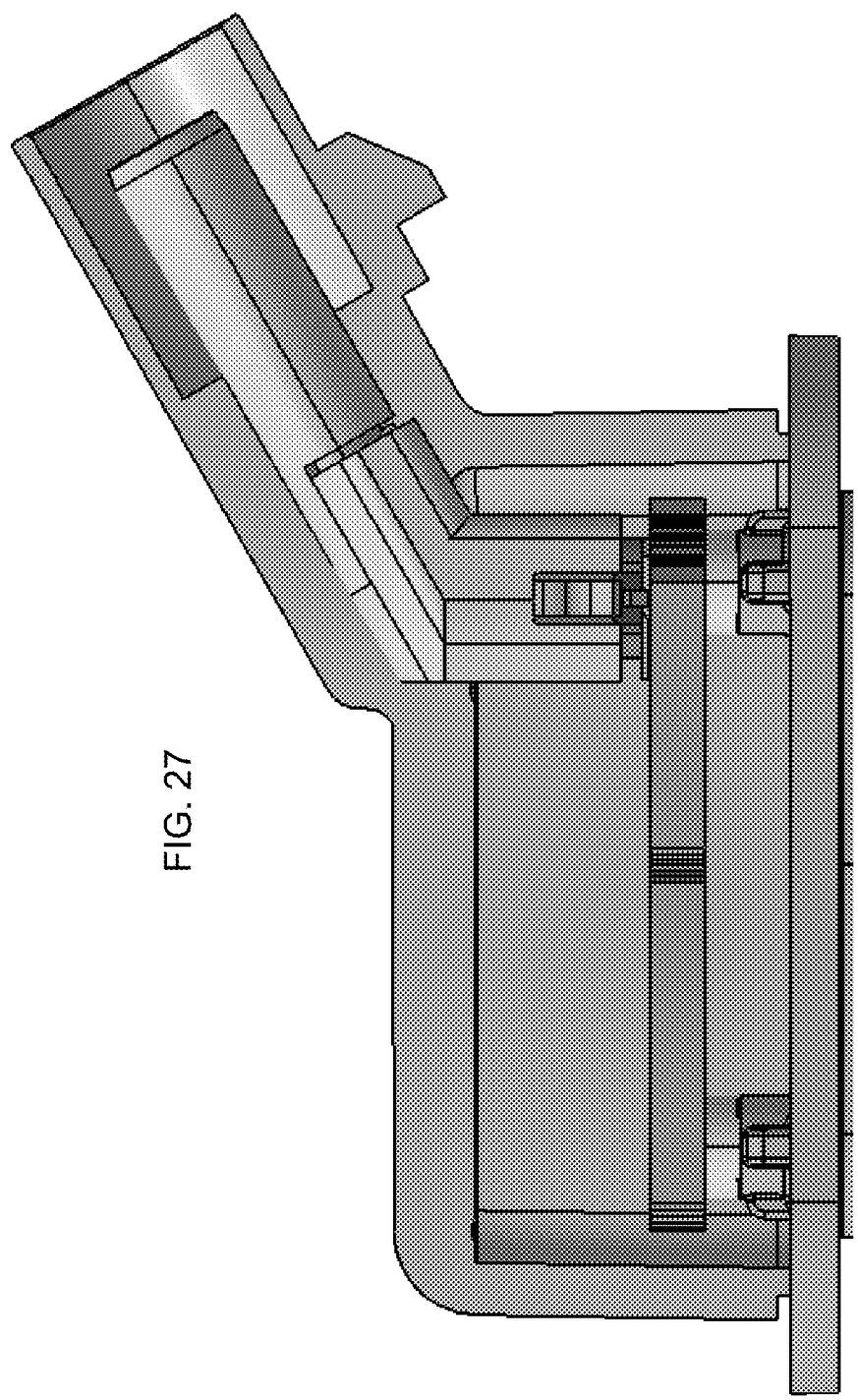
FIG. 27 is a partial sectional view of the rear portion of a camera's coaxial connector interface from the outside to the PCB fully assembled.
Figure 28:
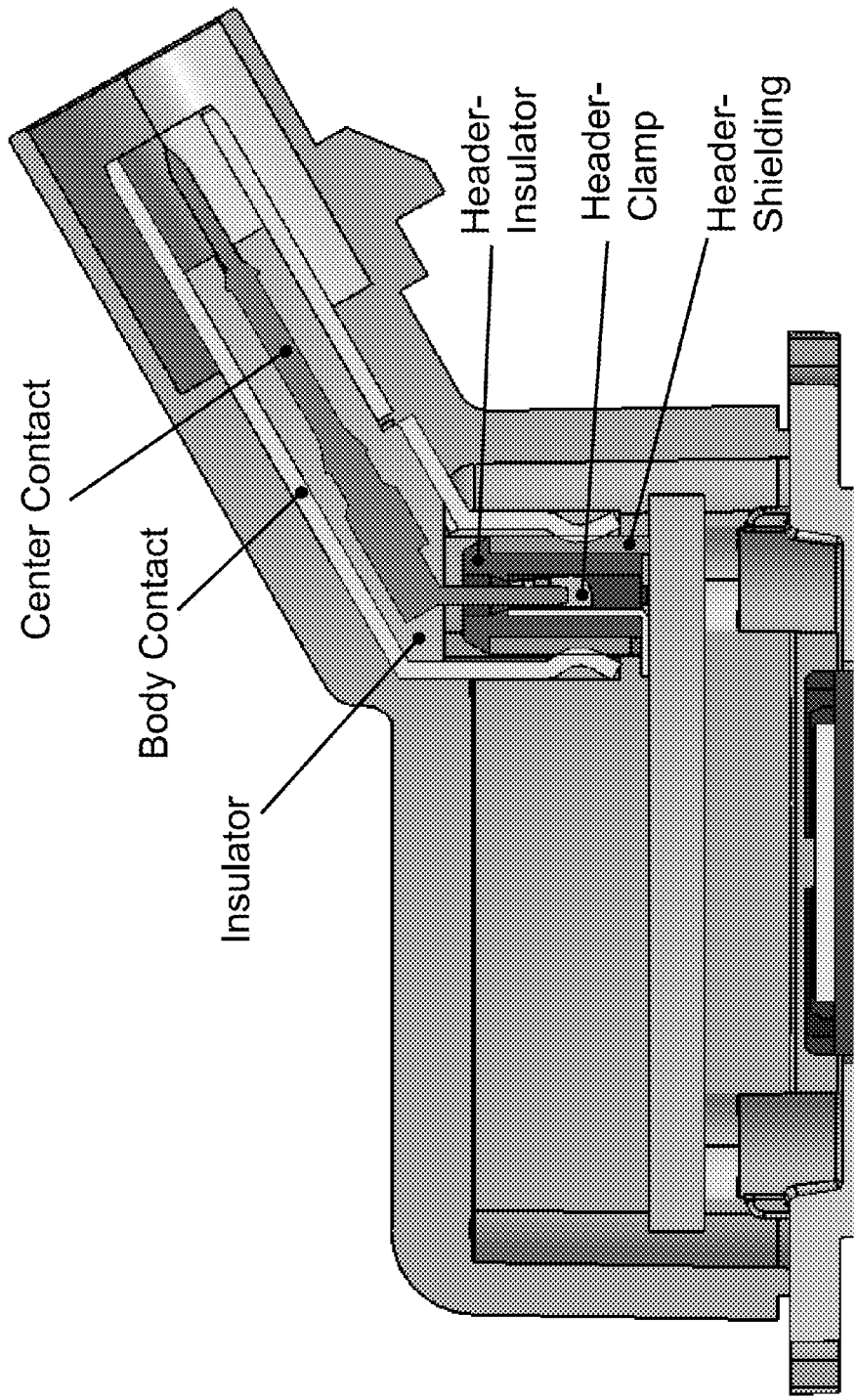
FIG. 28 is a fully sectional view of the rear portion of a camera's coaxial connector interface fully assembled, showing the inside of the coaxial connector molding piece which is molded to the rear camera housing structure and showing the mating of the core pin and the shield metal structures with the a PCB mounted header, and shown with the insulator or dielectric medium visible on both pieces.

Optionally, and with reference to FIGS. 22 and 23, a camera may include a connector and circuit board for use in interconnecting the coaxial connector at the housing with a piece of inflexible printed circuit board (PCB) using a connector socket on the housing inside and another connector mounted at the PCB. The piece of inflexible PCB may have shielding layers (such as copper shielding layers) on the top and the bottom and one or more core layers (such as one or more PCB insulation material layers or the like) in the center. The shielding layers may be interconnected by one or more vias and the core layers (such as copper portions of the core layers) may also be interconnected by one or more vias. The PCB material acts as dielectricum.

Optionally, and with reference to FIGS. 24A-C, 25A-B and 26A-C, a camera may have a molded stamping-folding (or crimp) part that is connected to a socket at the circuit element. Optionally, the stamping-folding (or crimp) part may be done as a press fit, inserted and held by clips, screwed in or glued into the outer connector contour structure. The stamping-folding part is connected to socket similar to what is shown in FIGS. 13, 13A, 14, 14A, 15 and 15A, but foldable. The molded stamping-folding part comprises a part that may be straight or angled (such as at 90 degrees or any suitable angle) so as to be configured for the bend or form of the camera housing and connector portion. The part may include or connect at a shield skirt (see FIGS. 24A-C, 25A-B, 26A-C, 27, 33A-B and 34A-B).

Optionally, and with reference to FIGS. 35-38, a camera coaxial connector may have a crimping part (with pin extensions), which is crimped to the shielding layer of a coaxial cable for connecting the camera on one of the cameras PCBs via an TFT, preferably an SMD pin socket (see FIG. 38), which is similarly mounted as those shown in FIGS. 10-15A, but with the difference that the pins' origin is out of a cable. The coaxial connector core may act as a pin which gets inserted as a socket contact in between two or more shielding contacts (preferably symmetrically disposed at opposite sides of the cable's core/pin). As an additional option, the core contact may be reinforced mechanically and by its electrical surface properties by a jacketing crimp or solder. The surface may be selected in a way that the mating area with the contacting socket withstands mechanical vibration stress, and, for example, may comprise a Nickel alloy or the like.

Figures 30A, 30B, 30C:
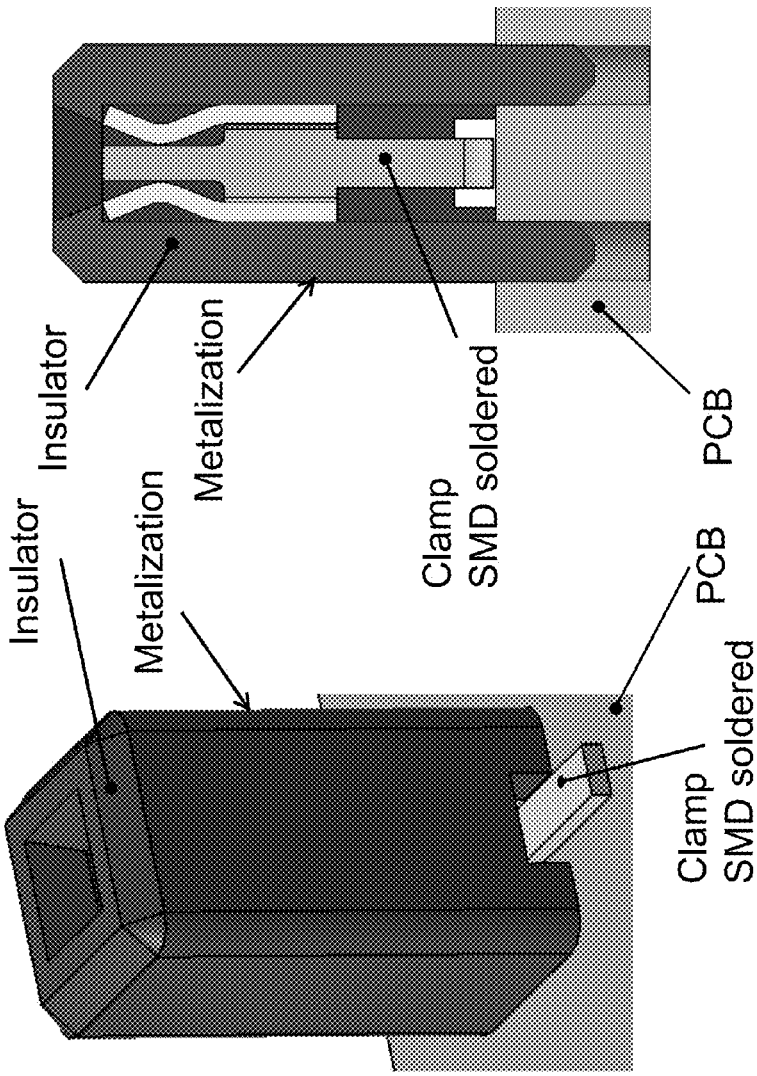
FIGS. 30A-C are perspective and sectional views of a SMD mounted PCB header or socket structure having metalized outer surfaces for shielding which insert to PCB holes or vias, shown with two additional through hole pin structures for stabilizing the socket before reflow and during connector mating.
Figure 33B:
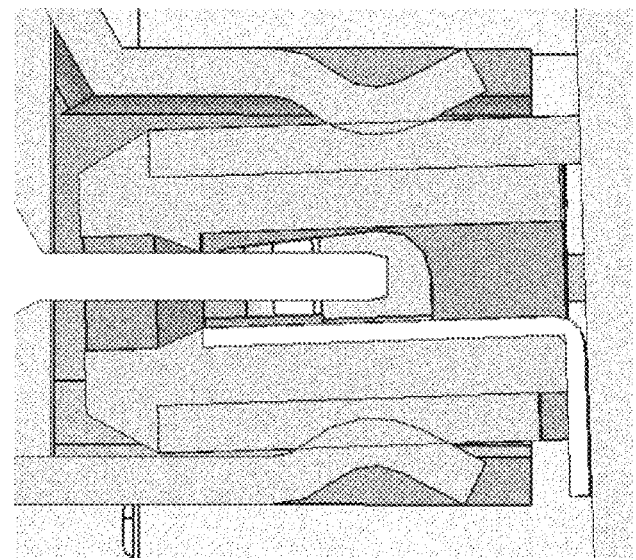
FIGS. 33A, 33B, 34A and 34B are sectional views showing how the spring lid portions of the camera rear housing inside connector structure are coping with about a 2 degree misaligning angle of the PCB (and with the header has about a 2 degree angle), with FIGS. 33A, 33B being Y-cross sections, and FIGS. 34A, 34B being X-cross sections, and with FIGS. 33B, 34B being enlarged or close up views of the mating portions shown in FIGS. 33A, 34A, respectively.
Figure 33A:
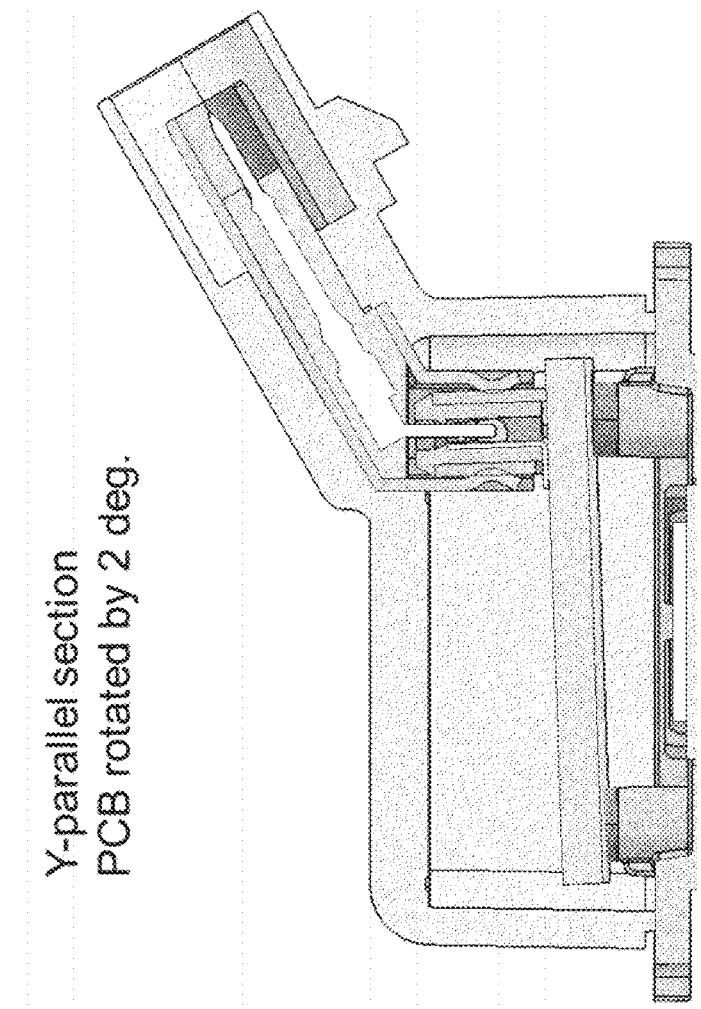
Figure 34B:
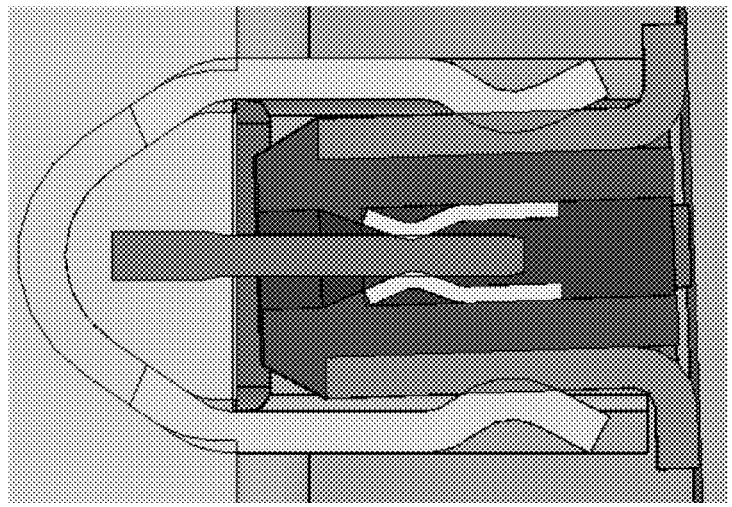
Figure 34A:
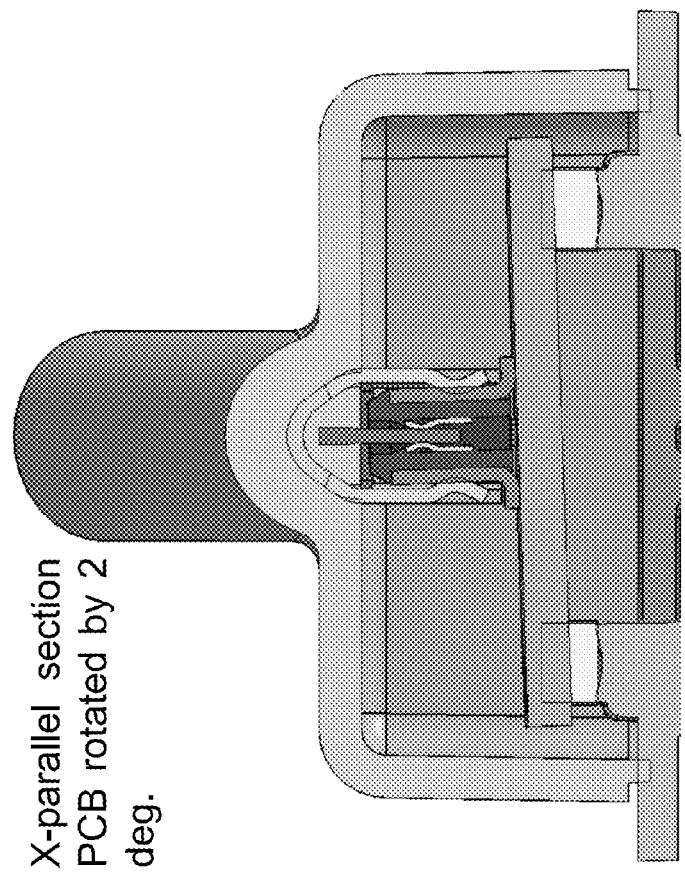
Figure 35:
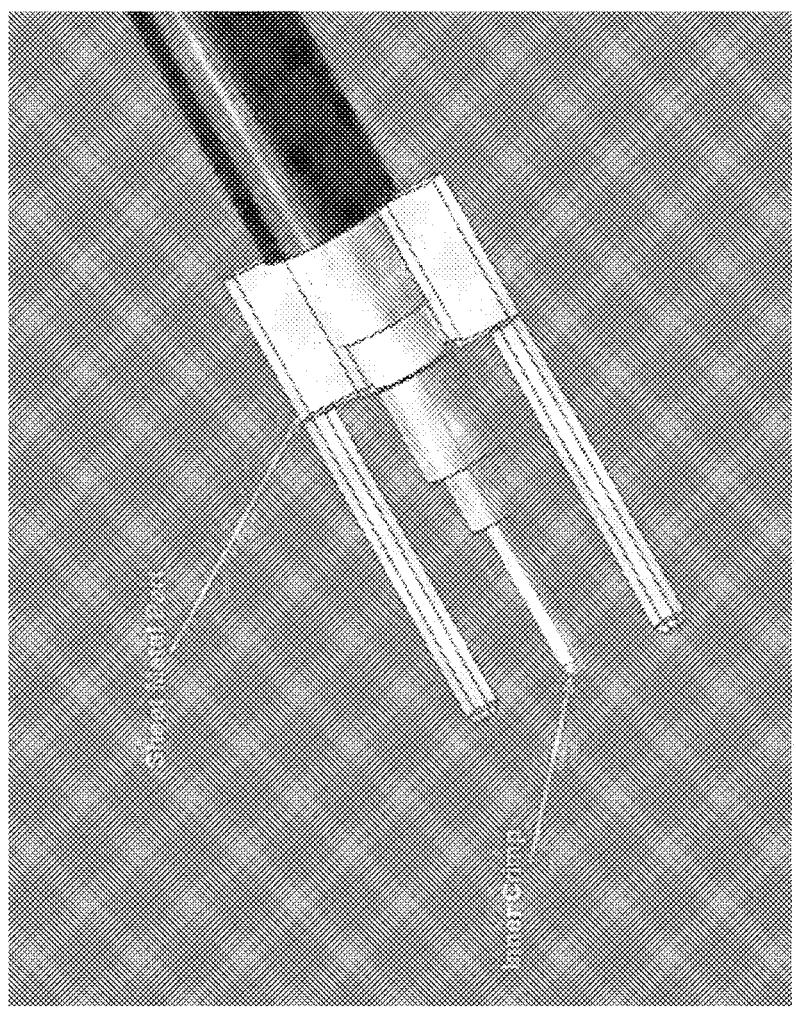
FIG. 35 is a view of a coaxial cable showing pin extensions of a crimping part which gets crimped around the shielding layer of the coaxial cable, with the coaxial cable's core acting as another pin, and with the two pin extensions having equal distance to the core, and with the pins assembled to be insertable into a socket of a PCB.
Figure 36:
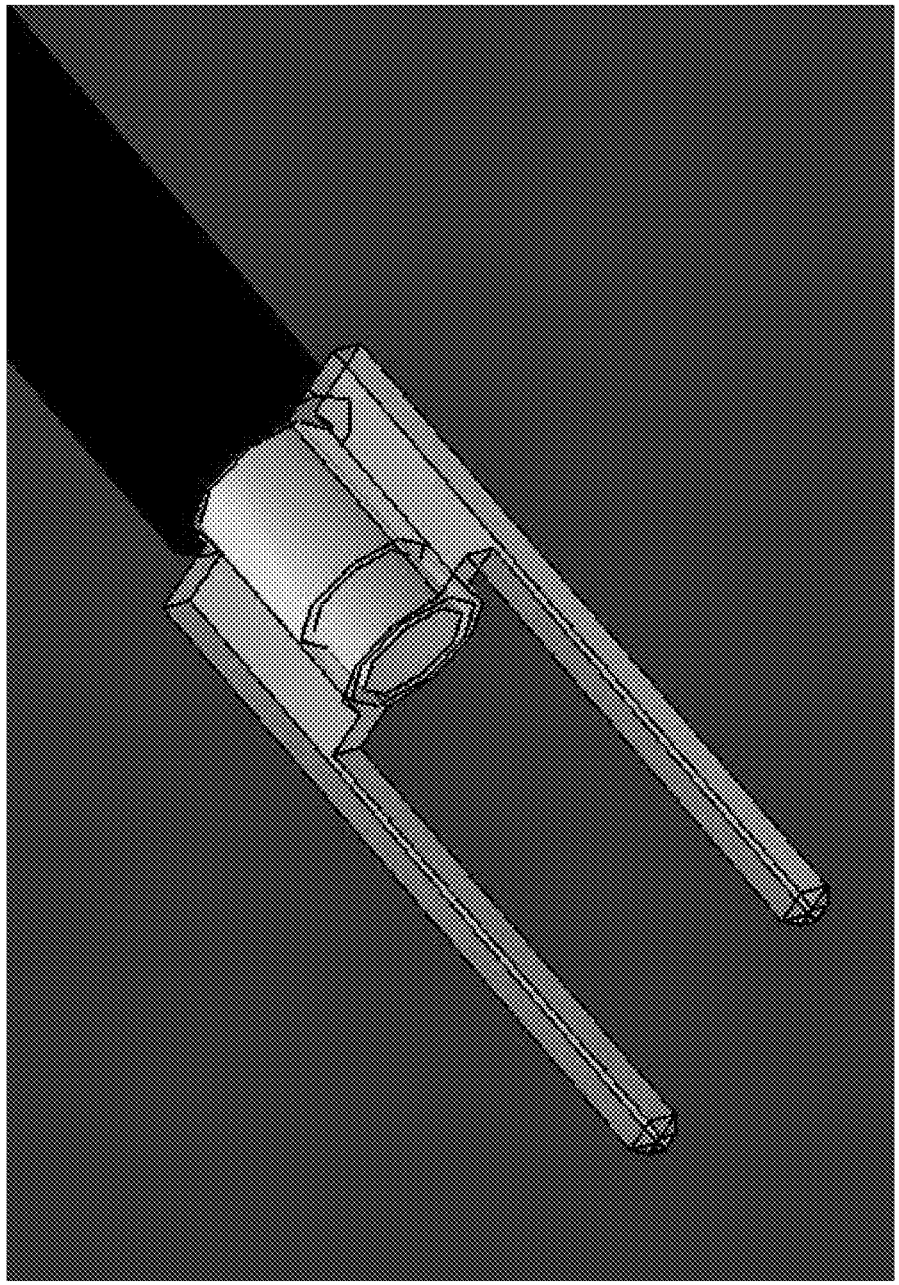
FIG. 36 shows a semitransparent model of crimping part of FIG. 35, shown crimped to the shield of the coaxial cable.
Figure 37:
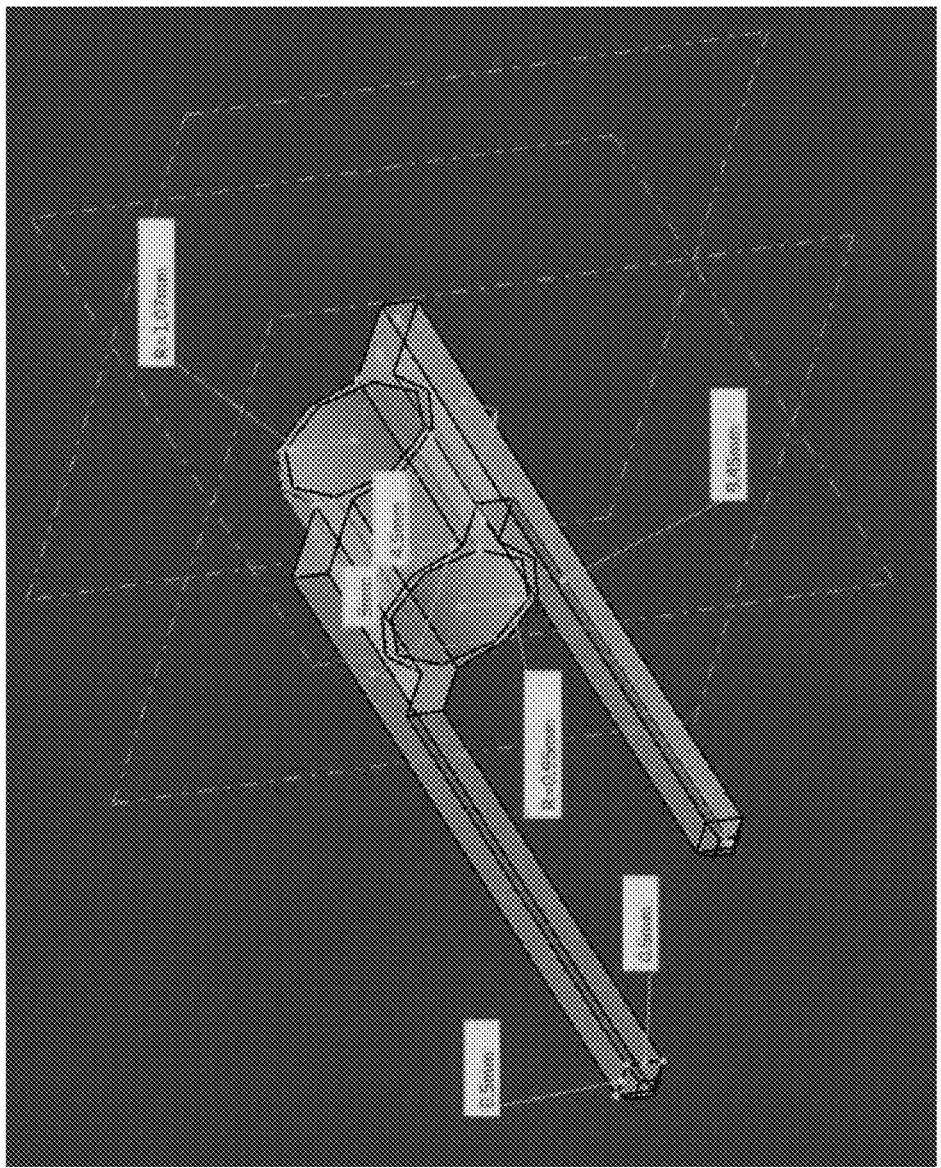
FIG. 37 shows the crimping part of FIG. 35 alone with its dimensions labeled.
Figure 38:
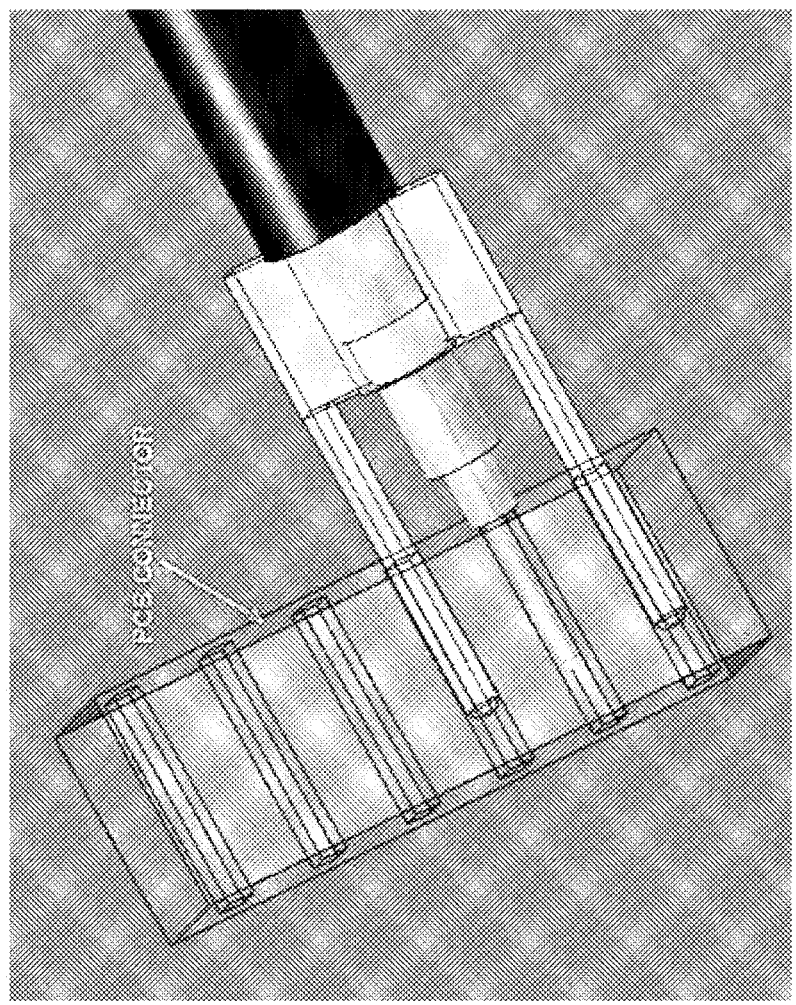
FIG. 38 is another view of the coaxial cable and crimping part of FIG. 35, shown with the pins inserted into a PCB connector or socket.

Optionally, the connector mating part mounted on the PCB (preferably SMD mounted) may have an electrical conducting shielding jacket (see FIG. 29B as well as FIGS. 24A, 24C, 25A-B, 27, 28, 29A, 30A-C, 31A-C, 32A-E, 33A-B and 34A-C). Optionally, it may comprise a (connector mating) PCB socket structure (see FIGS. 24A, 24C, 25A-B, 27, 28, 29A-B, 30A-C, 31A-C, 32A-E, 33A-B and 34A-C). Optionally, the electrical conducting plating of the header or socket structure (outside surface) may be a stamping-folding part with the dielectric medium (insulator) and core pin connector contact structure inserted as inlay (see FIG. 29B as well as FIGS. 27, 28, 29A, 33A-B and 34A-C). As another option, the electrical conducting plating of the socket structure (outside surface) may be metallized (see FIG. 30B as well as FIGS. 30A, 30C, 31A-C and 32A-E). When the dielectric medium is a kind of ceramic or plastic, the metallization may be applied as vapor deposition (PVD and CVD, such as, for example, from Fraunhofer IST), thermal spattered, atmospheric pressure or low pressure plasma metalized, low temperature plasma deposition (such as Plasmadust® of Reinhausen Plasma GmbH), hot printed (such as Flamecon® by Leoni), chemically disposed, or coated eventually in combination of a plasma pre-treatment (activation). Optionally, the socket structure may have SMD PCB contacts and through-hole elements for better placing before reflow (see FIGS. 30A and 30C). Optionally, the through-hole contacts may have a metallization which is conducting the shielding of the mating PCB socket structure (see FIG. 30A). Optionally, the through-hole structures may be designed as press fit contacts. Optionally, the press fit contacts may be stamped out of the identical metal piece from which the shield jacket is formed.

Figure 41A:
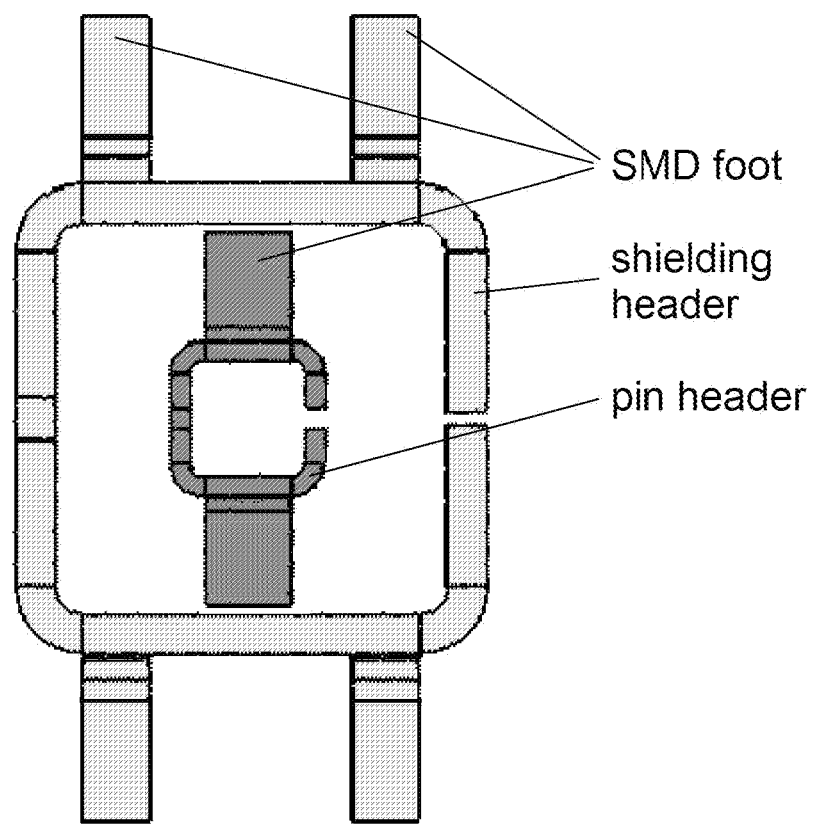
FIG. 41A shows a top view of a SMD header socket for receiving a coaxial header made of a shielding piece and a pin receiving clamp piece (female) both aligned concentrically and both made of one metal piece each, such as by stamping and folding, and both shown with SMD feet.
Figure 41B:
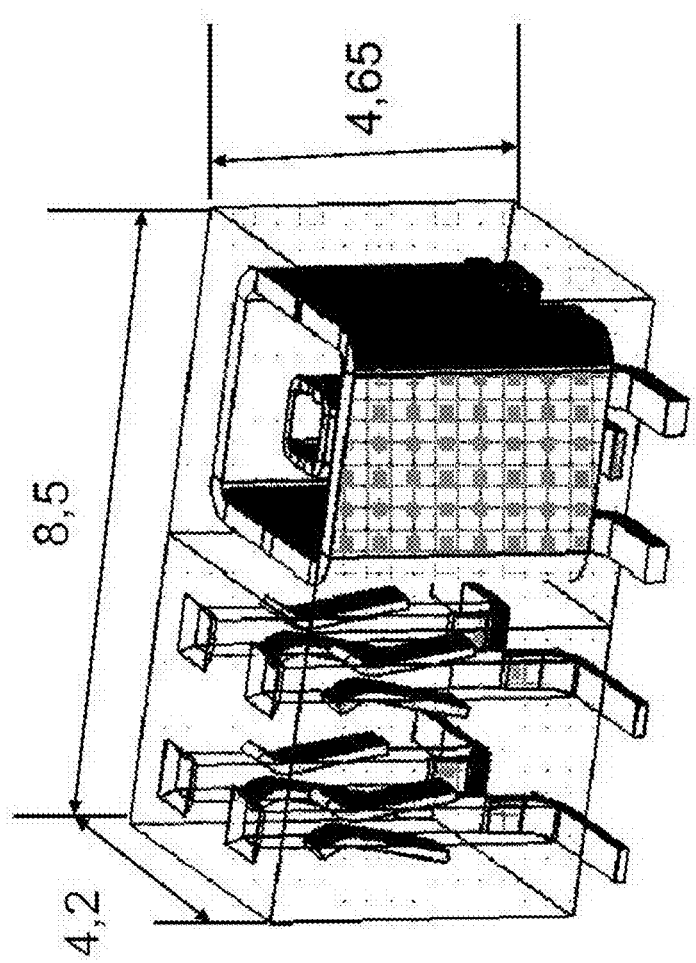
FIGS. 41B and 41C show the two stamping-bending/crimped header pieces for a coaxial aligned one SMD-header together with four receiving clamps for non-coaxial pin contacts.
Figure 41C:
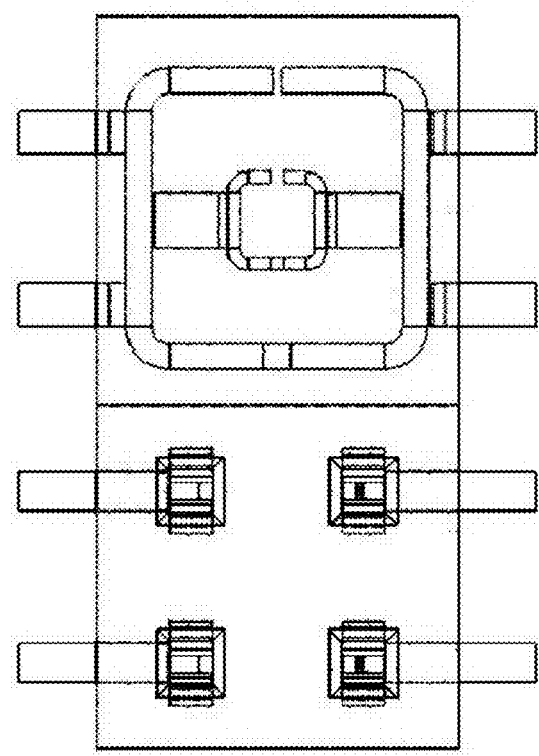
Figure 41D:
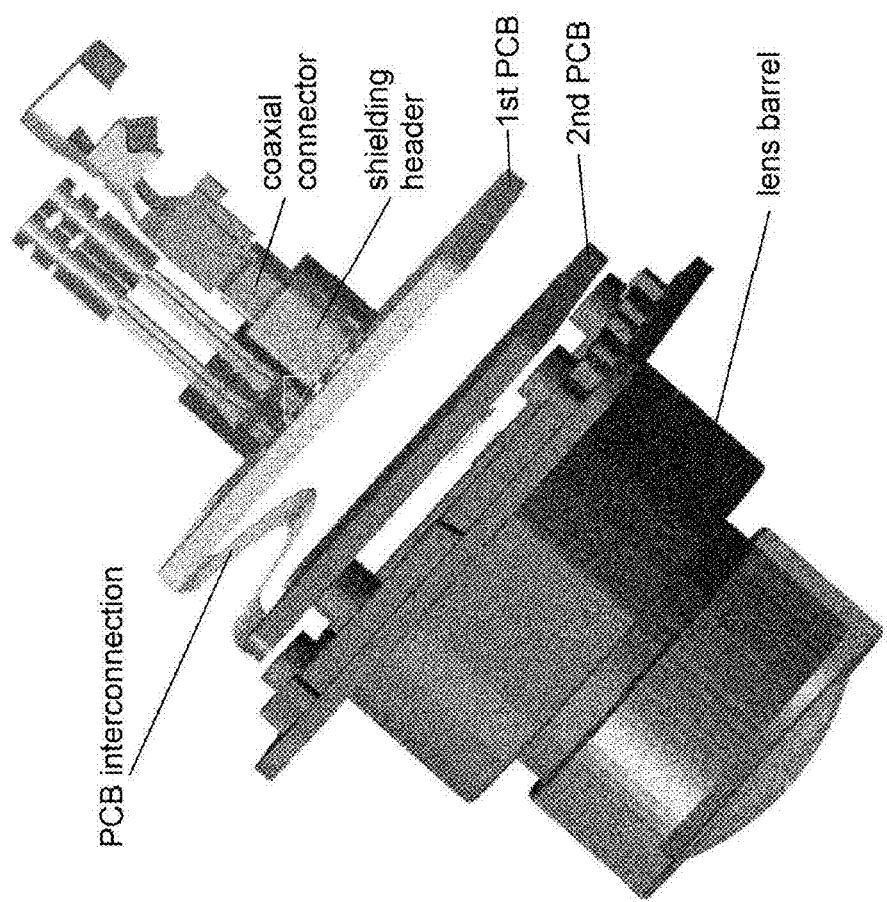
FIG. 41D shows a camera without the rear housing and having a header mounted as shown in FIGS. 41B and 41C, with the coaxial connector plugged in extending from the rear housing structure, and shown without the rear housing structure to show the connectors alone.
Figure 41E:
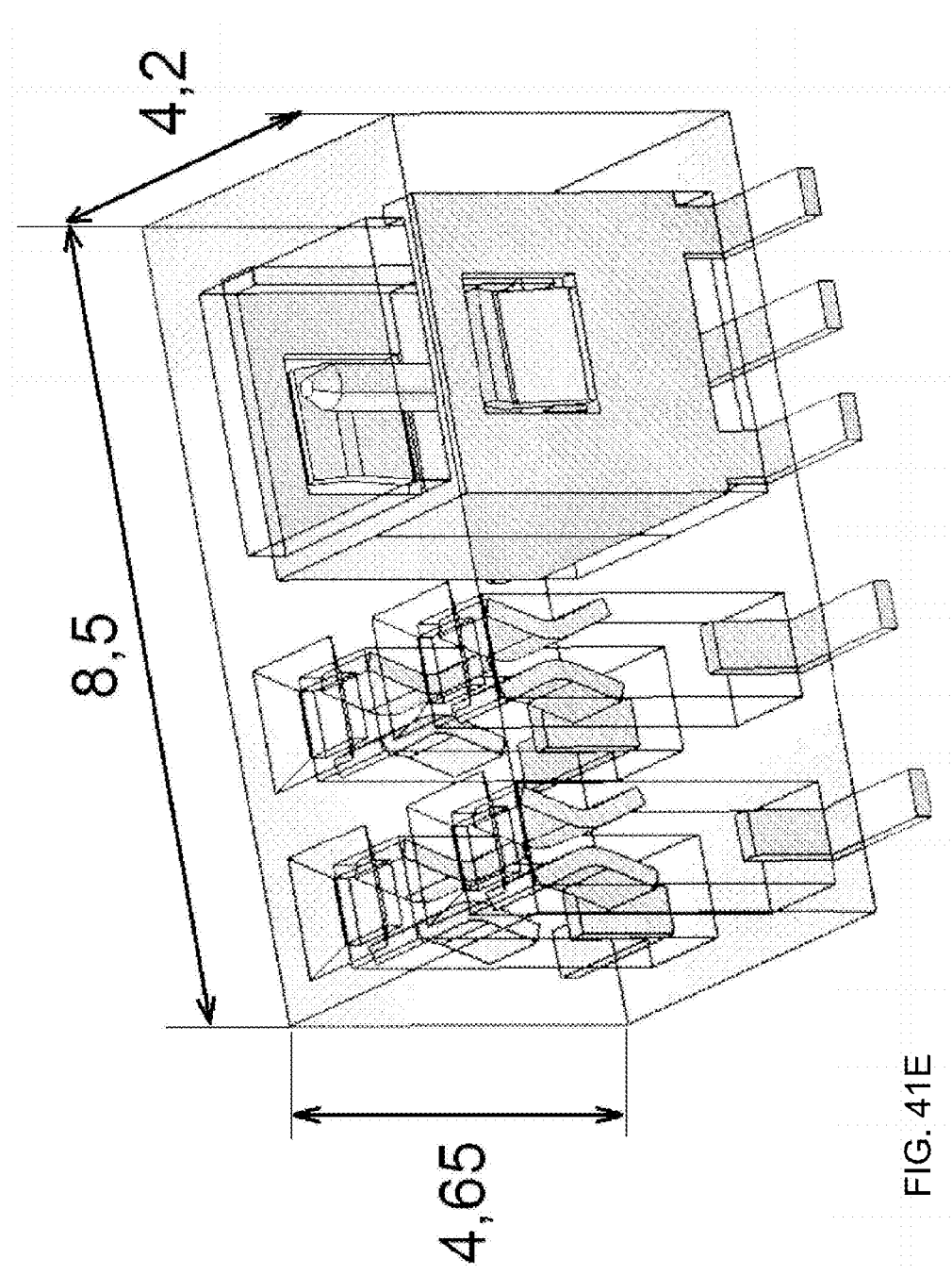
FIGS. 41E-F show a SMD header socket similar to that of FIGS. 41A-C, but having a solid pin (male) as a coaxial core contact.
Figure 41F:
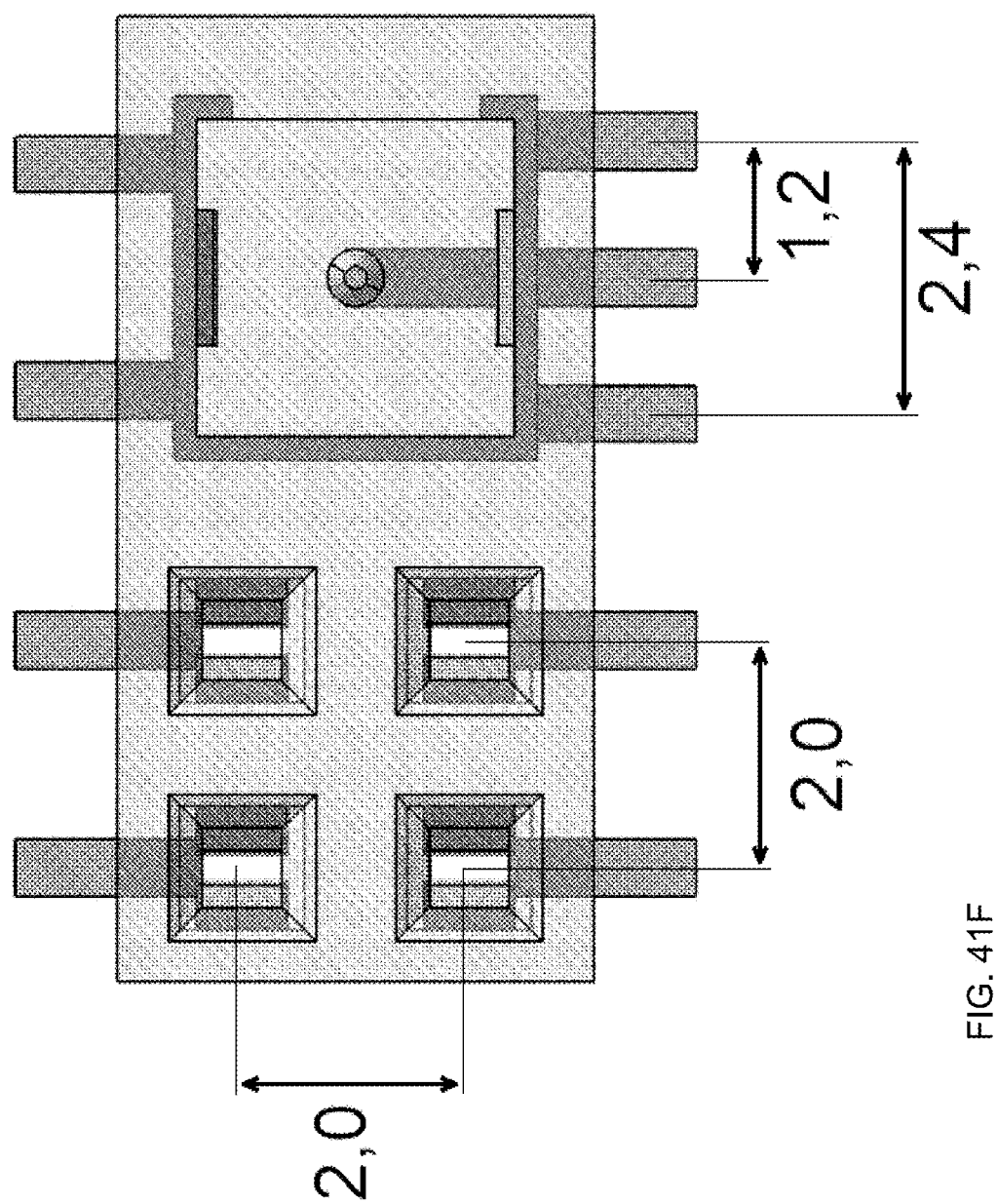
Figure 41G:
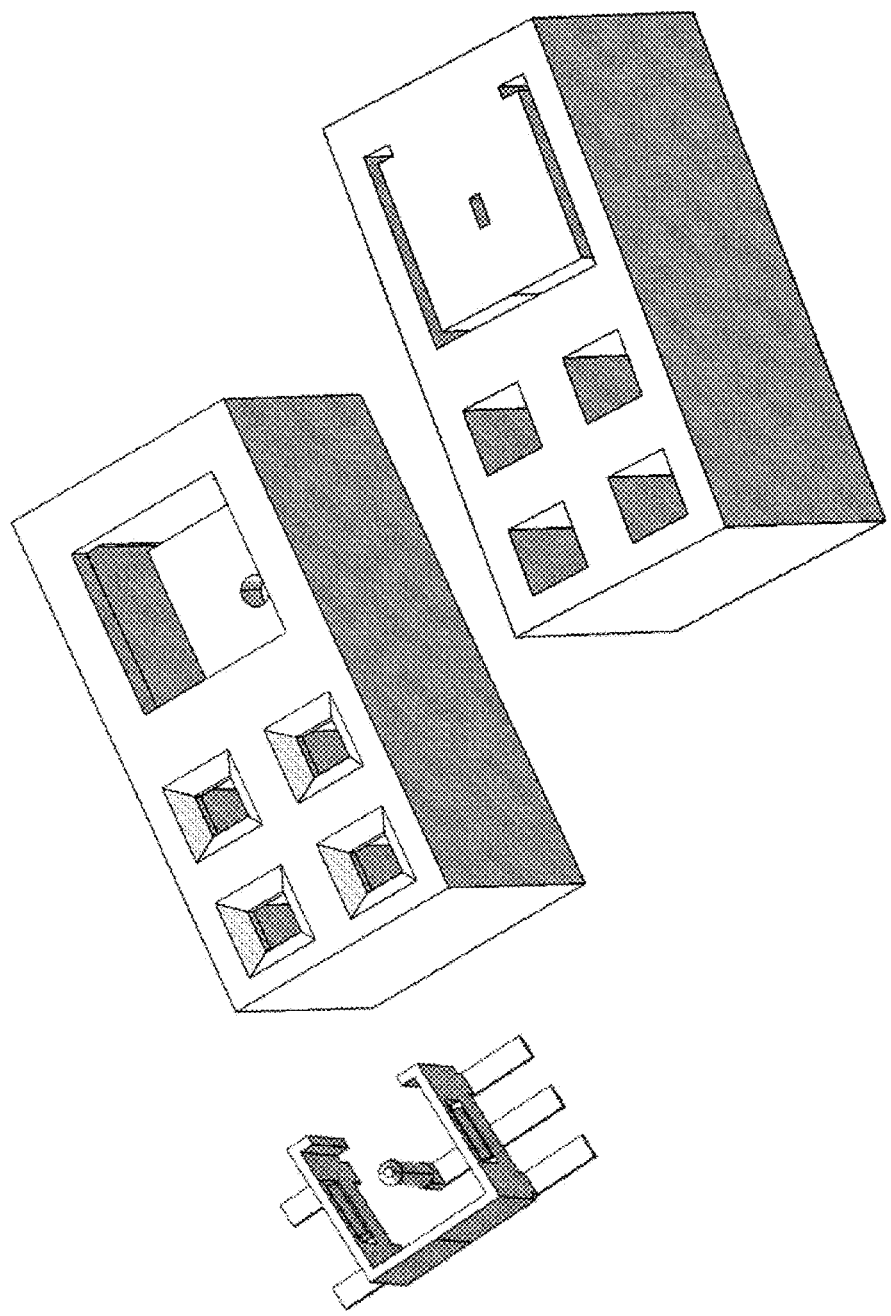
FIG. 41G shows a two piece stamping-bending/crimping connector solution for being inserted to a non-conductive header piece.
Figure 41H:
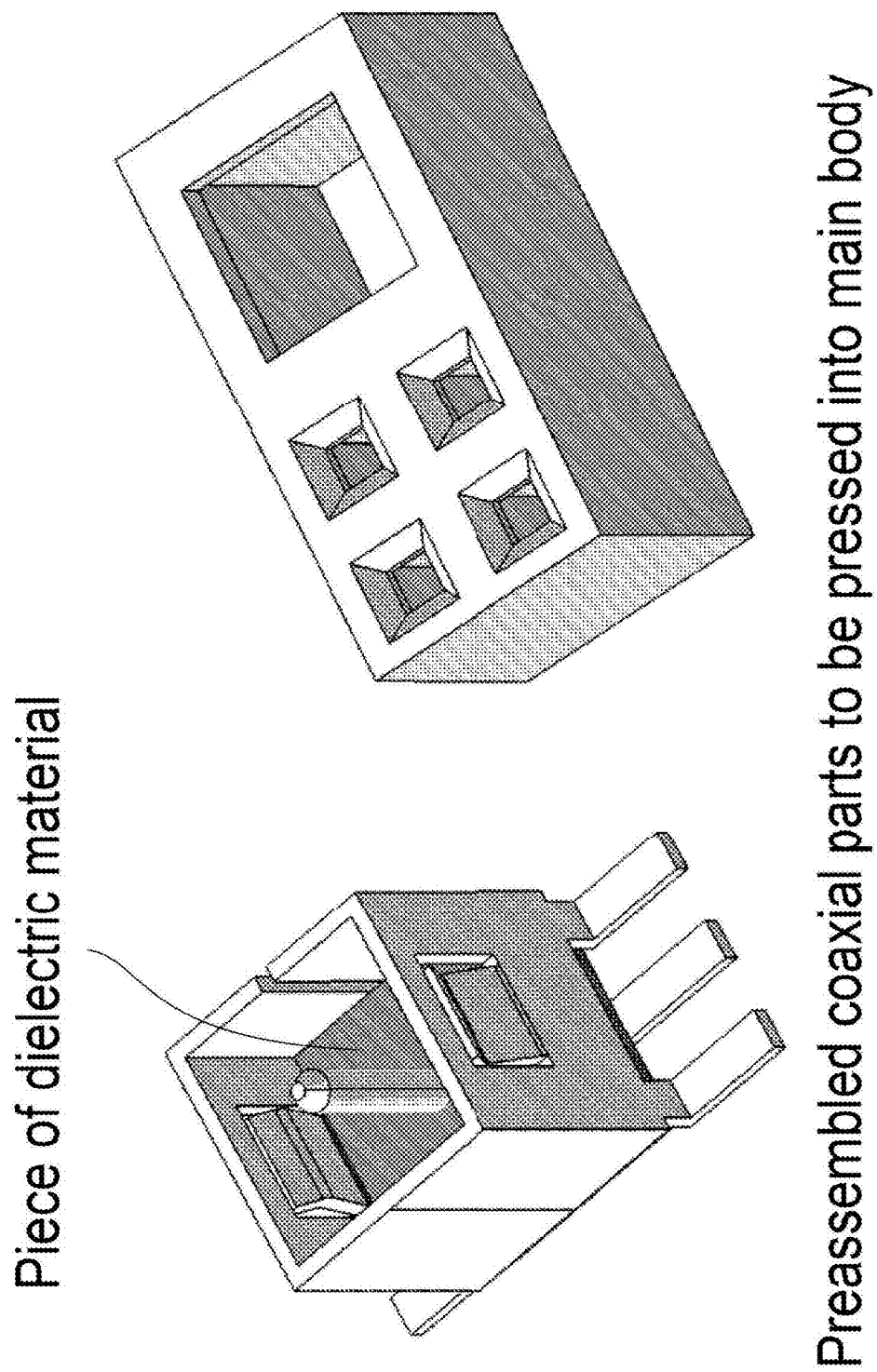
FIG. 41H shows another connector solution with an additional dielectric inlay for holding and centering the coaxial core pin.

Optionally, and with reference to FIGS. 41A-D, a camera coaxial connector header may be made as a two piece stamping-bending/crimping part, with one stamping-bending/crimping part the shielding (shielding header) and with one stamping-bending/crimping part as the core pin receiving clamp (female pin header). Both pieces may be stamped and/or bent or formed as one piece before being separated into two pieces. The separation may preferably be done in one stamping step of a progressive stamping tool. The pin header may be either a female connector, such as shown in FIGS. 41A-C, for being connected with a male counter pin coming from the coaxial connector, or a male connector, such as shown in FIGS. 41G-H, for being connected with a male counter pin coming from the coaxial connector. Optionally, both pieces may possess SMD feet for being SMD mountable, such as shown in FIG. 41A. Optionally, these pieces are handled separately or in a symmetrically aligned common structure such as a plastic header. FIGS. 41B, 41C, 41E and 41F show the two stamping-bending/crimped header pieces for a coaxial aligned in one SMD-header which also comprises four receiving clamps for non-coaxial pin contacts. The counterpart reaching out of the camera rear housings structure may be done as a stamping-bending/crimp structure as well, such as shown in FIG. 41D. The coaxial parts may be assembled directly into the main body, such as shown in FIG. 41G, or may be both preassembled to become one piece and inserted to the main header body, such as shown in FIG. 41H. There may be another piece of dielectric material which may be inserted into the bottom or lower area centering the pin structure into the middle of the shielding. The whole preassembled unit may be suitable to be handled as one pick and place SMD piece.

The stamping-folding part in FIGS. 24A-C and 25A-B has one core pin in the center and pins for conducting the shielding to the PCB aside. In the solutions of FIGS. 26A-34B, there is one center pin and the shield is continued as a jacket (or skirt) and directly conducted to the shield of the mating SMD connector shield which itself is conducted to the PCB's shield layers either by vias or by through-hole pins, such as shown, for example, in FIG. 30A. FIGS. 31A-C and 32A-E show the assembling (marriage) of the camera's rear housing complex with the lens holder complex bearing the PCB with the rear housing stepwise closing towards the lens holder complex. In step 4, the connector is fully mating. Optionally, the SMD header or socket structure on the PCB may have an angled flange at the top edges especially at the center pin flanges and/or the outer edges flanges for easing the mating with the connector of the rear cover. Optionally, the rear cover connector's shield may have the ends formed angled so that these are assembled funnel-like to ease the mating with the SMD header or socket structure on the PCB. Optionally, the center pin may have angled edges as well. Optionally, there may be spring like decoupled portions in the rear housing's shield structure outer end which may bend inwards (see FIGS. 26A-C). When mating with the SMD header or socket structure, these spring portions are bent (elastically) outward. These spring portions bending space is the clearance for compensating misalignment between the rear housing connector structure and the SMD connector structure rotational in three space dimensions and positional in two space dimension (X and Y). The possible heights misalignment (z-dimension) is coped by the clearance in insertion depths of the mating connector. This is shown in FIGS. 32A-E and 34A-B.

Figure 39A:
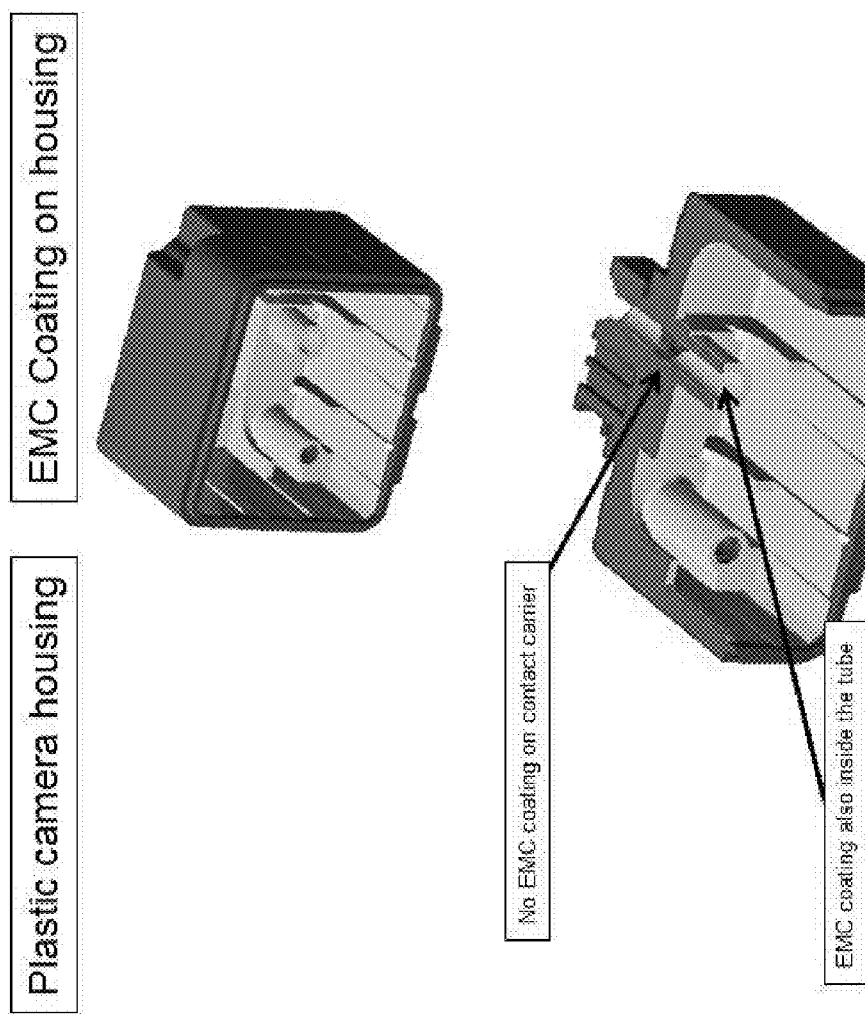
Figure 39B:
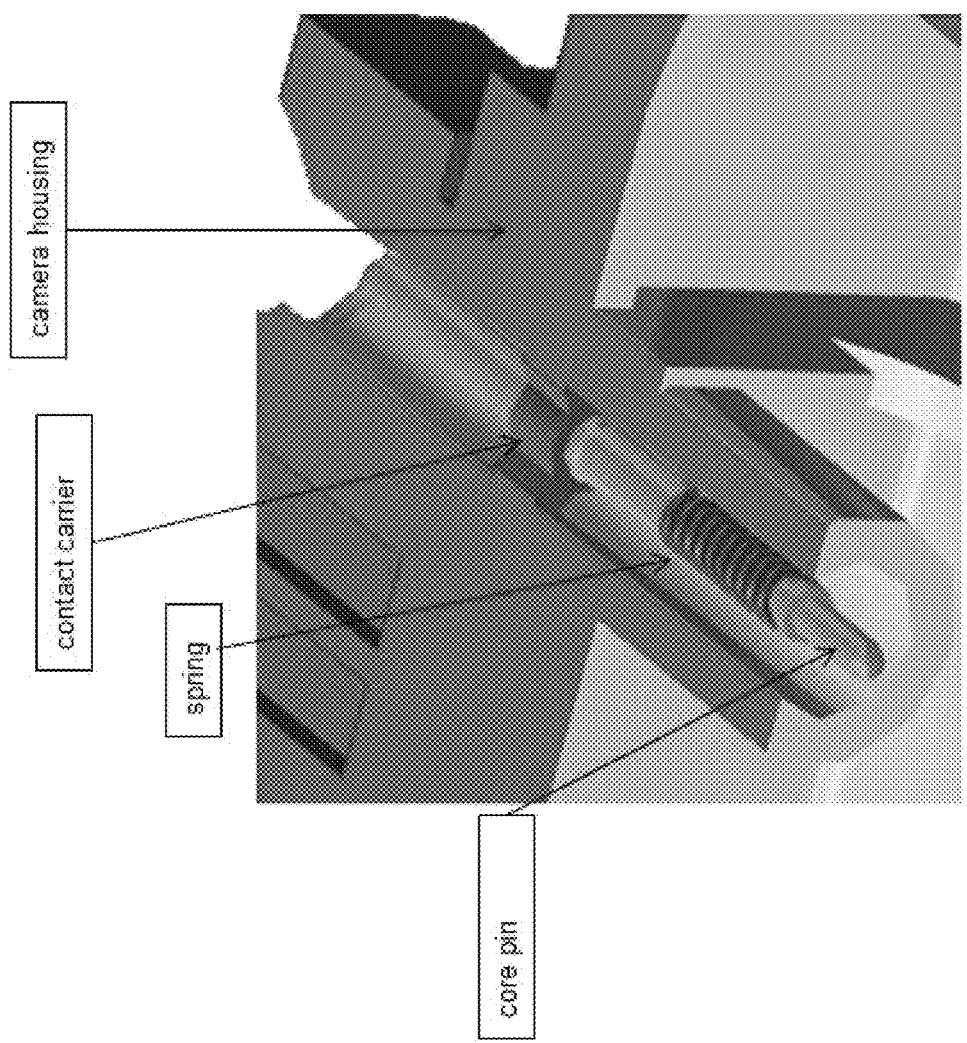

As described in U.S. patent application Ser. No. 13/785, 099, incorporated above, single telescoping pins were suggested to be provided for coping with the misalignment of PCBs. As another option of the connector assembly of the present invention, a telescopic pin may come into use as core pin of a coaxial connector, such as a connector for a Leoni DACAR 462 coaxial cable or the like. For example, and such as shown in FIG. 39I, the telescopic or spring force actuated end of a coaxial core pin may lead on top of the surface of a PCB inside a camera housing. The PCB pad at which the coaxial core pin rests may be Silver or Gold plated. The (rear-) housing's inner surface may be coated by a HF conducting material or optional MID material plated (as discussed below). The channel that the core pin is guided through may be coated as well (see FIG. 39A). As can be seen in FIG. 39B, the coaxial core contact may be carried by a center contact carrier, which holds the contact in the geometrical middle of the channel and the carrier may not be coated conductive.

Figure 39C:
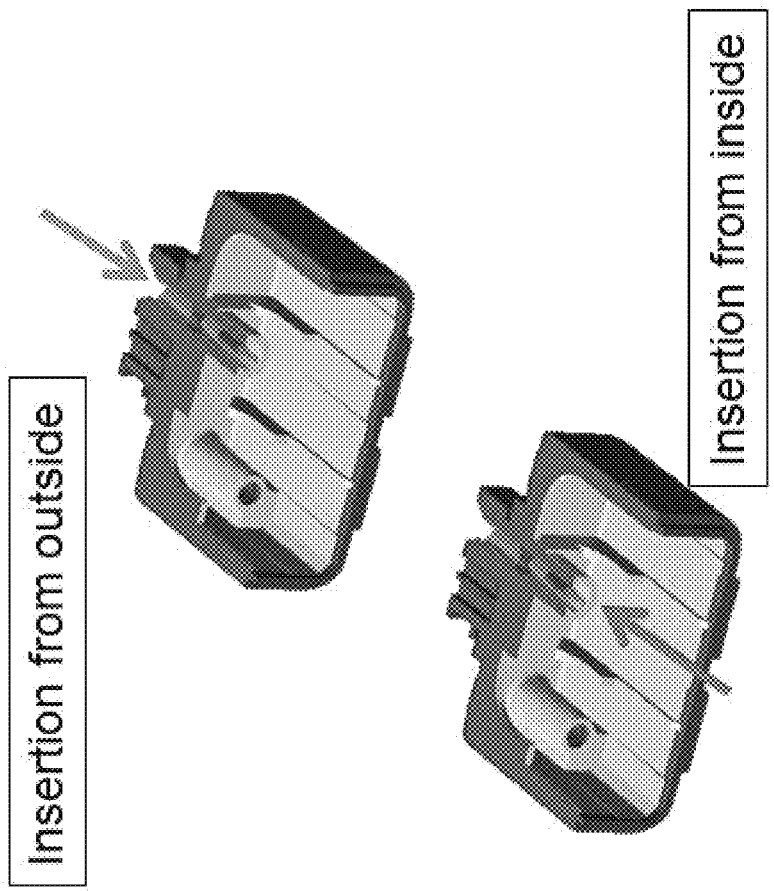

For assembly there may be two options. Optionally the center core pin may be inserted from the inside of the housing or optionally from the outside, both having different assembly constraints (see, for example, FIG. 39C). When connecting from outside, the core pin can be assembled to the wire harness before assembling the camera.

Figure 39D:
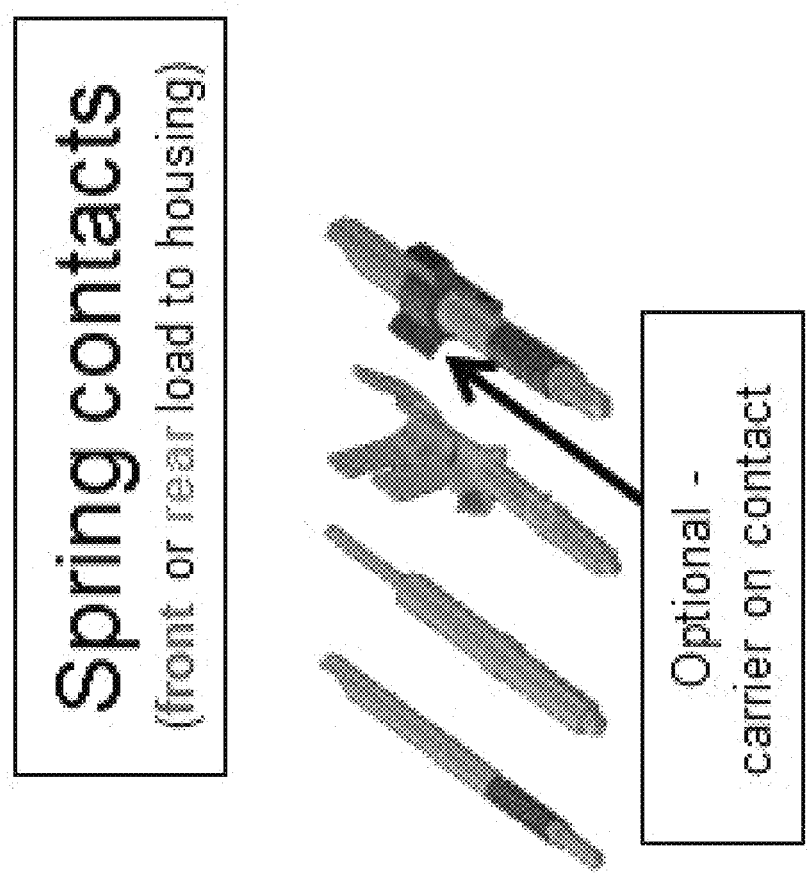

FIG. 39D shows some optional setups of how the telescopic coaxial center core pin may be made. Optionally, the spring may be inside, such as shown in the detailed example of FIG. 39K (dimensions in millimeters). Optionally, the spring may be outside. Optionally, the contact may be crimped on by the connector. Optionally, the contact carrier may come with the pin or may be part of the camera housings mold or MID (as discussed below).

The ratio between the pin diameter (such as 1.8 mm in FIG. 39K) may be chosen corresponding to the diameter of the housing wall, which is acting as shielding (such as shown in FIG. 39B), and which may be 3.45 mm for achieving a dedicated impedance ($Z_{o\infty}$) determined by the following equations:

$$Z_{o\infty} = \frac{60}{\sqrt{\varepsilon_r}} \ln \frac{D_e}{d_e}$$

$$e^{\frac{Z_{o\infty}\sqrt{\varepsilon_r}}{60}} = \frac{D_e}{d_e}$$

where $\varepsilon_r$ is the relative dielectric constant of the insulation, $d_e$ is the diameter of the pin and $D_e$ is the diameter of the shielding or dielectric medium around the pin (such as a cylindrical dielectric or shield portion around the pin).

Figure 39E:
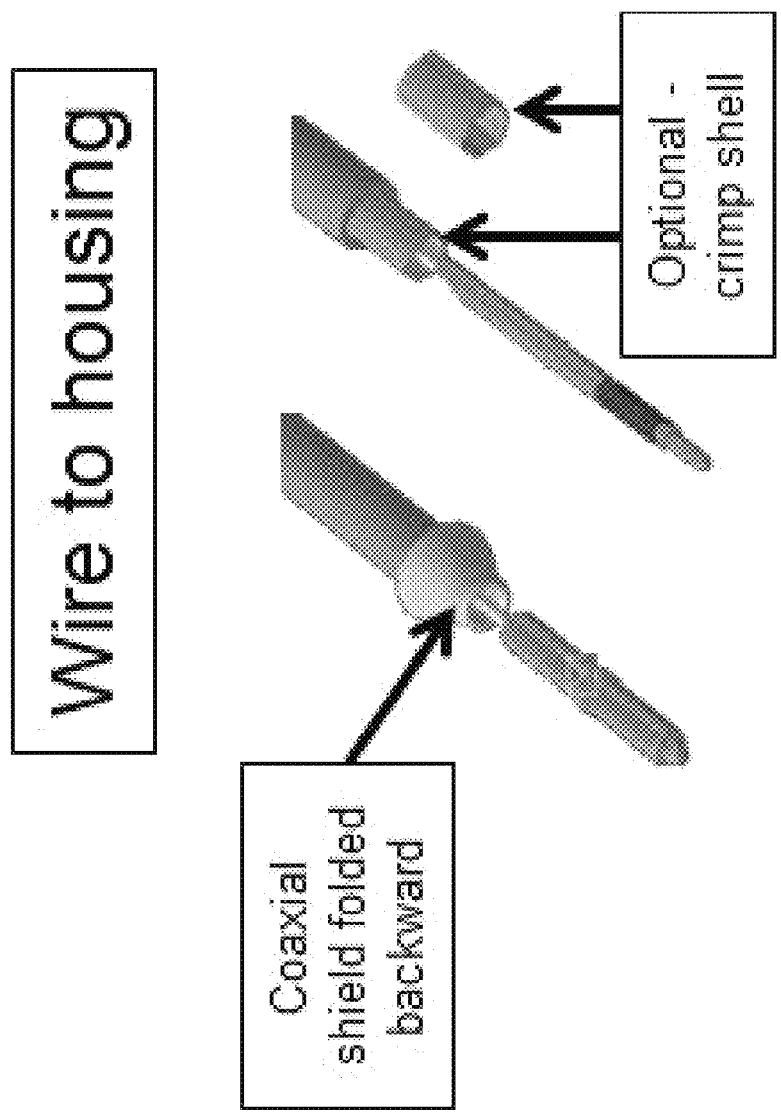
Figure 39F:
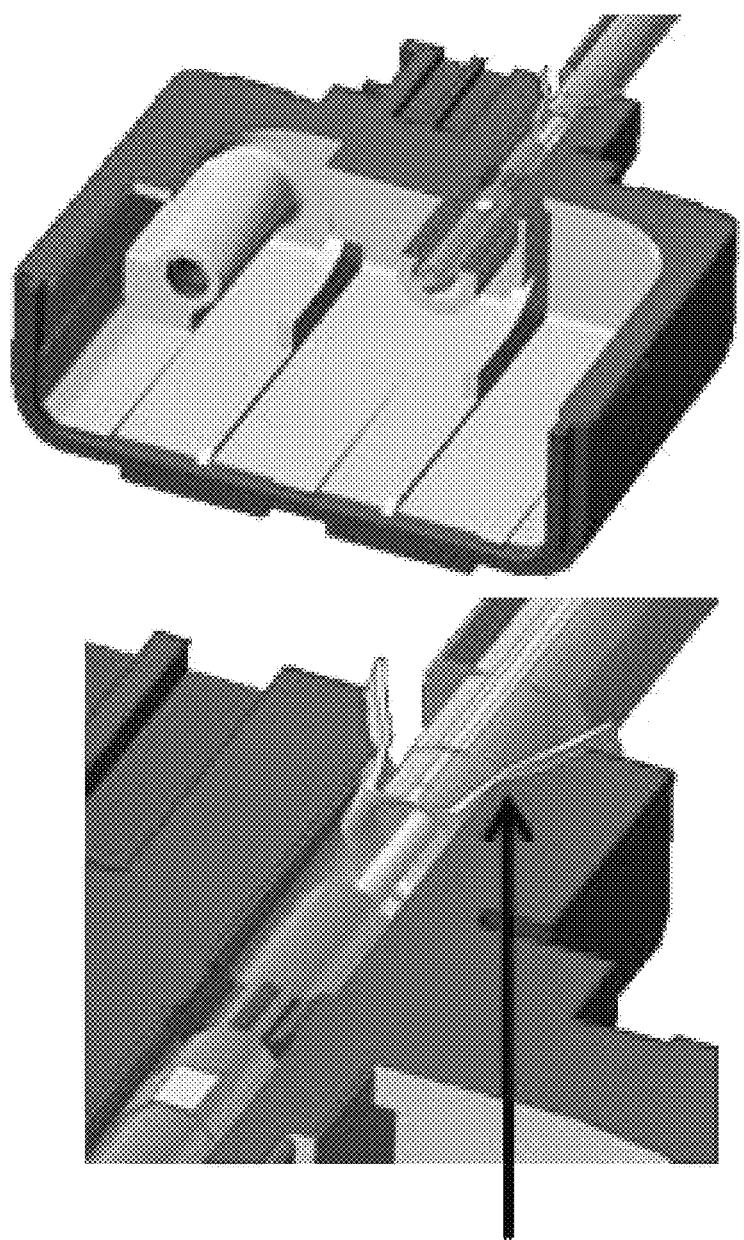

FIG. 39E shows an optional crimp shell to hold the coaxial shield in defined position for assembly. Optionally, the shield may be folded back. When inserted (see FIG. 39F), the shield or crimp shell will conduct with the camera housings coating or optional MID Material. Optionally, the housing's connector structure may have cutting flanges for enforced contacting of the cable's shield and end fastening. Optionally, the cable's jacket may be cut through by the housing structure's cutting flanges when inserting the cable.

Figure 39H:
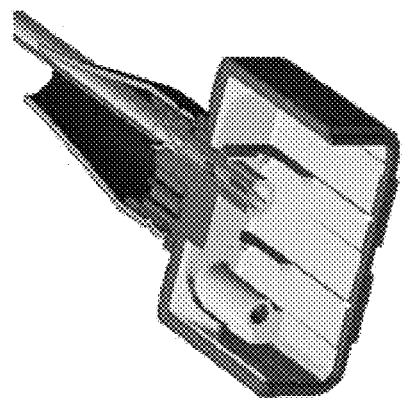
Figure 39G:
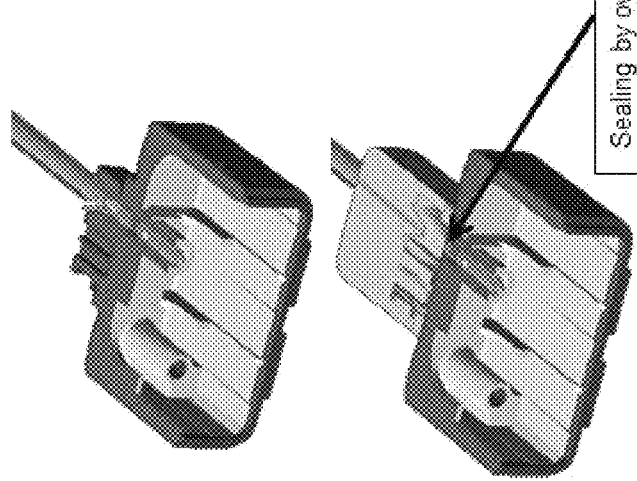

In that case the stripping of the cable jacket before assembling can be omitted as a process or work step. As shown, the coaxial connector tightening may be applied by a shrink tube or by overmolding (see FIGS. 39G, 39H and 39I). The housing's shielding structure may end in a short distance above the PCB's surface, sufficient for HF conducting.

Figure 39J:
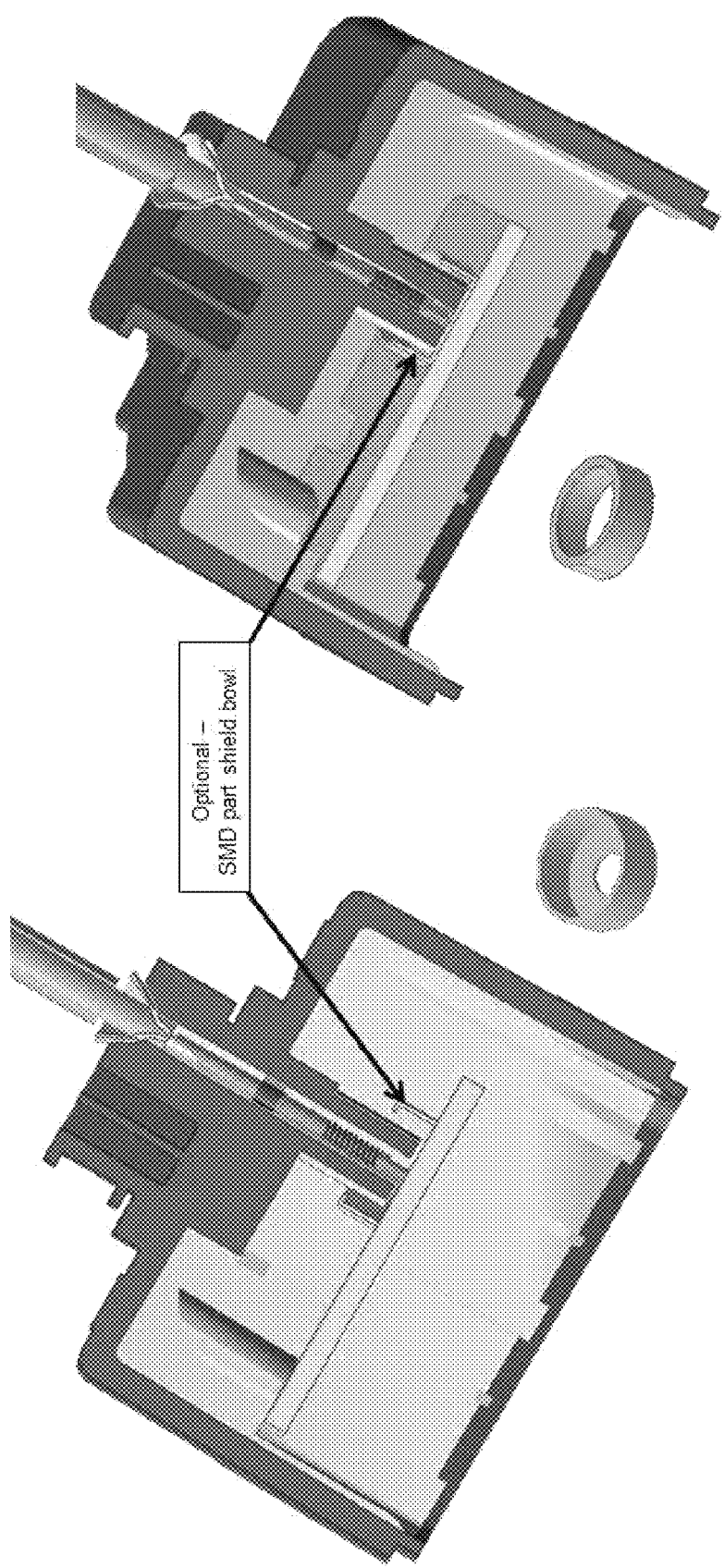
Figure 39K:
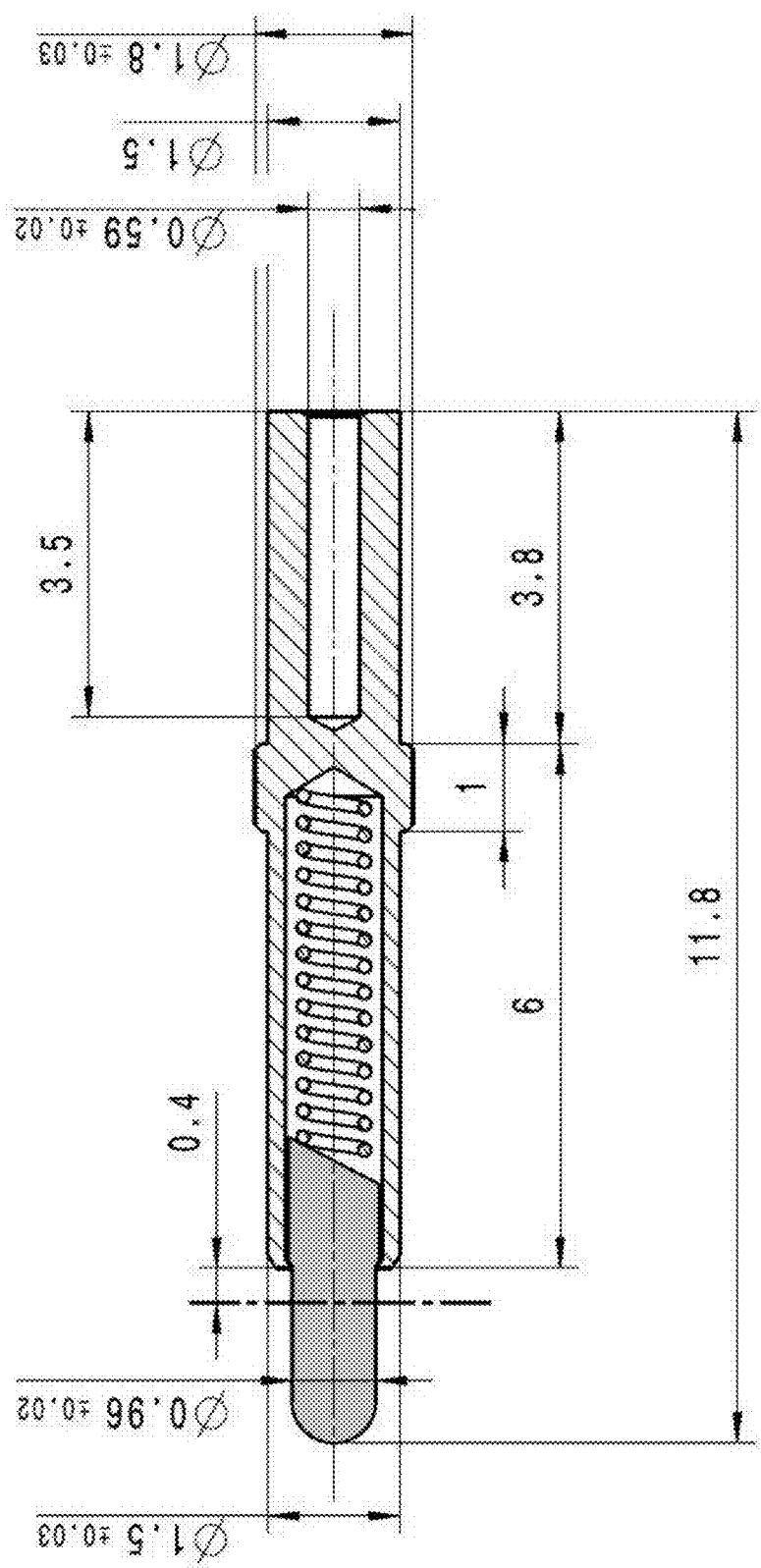

When the system requires DC power conduction via the coaxial cable, the gap may be closed by a conducting paste, such as, for example, a copper paste or the like. For enhanced shield conducting, the PCB may have an optional metal ring counter facing the shield connector structure (see FIG. 39J).

Figure 40:
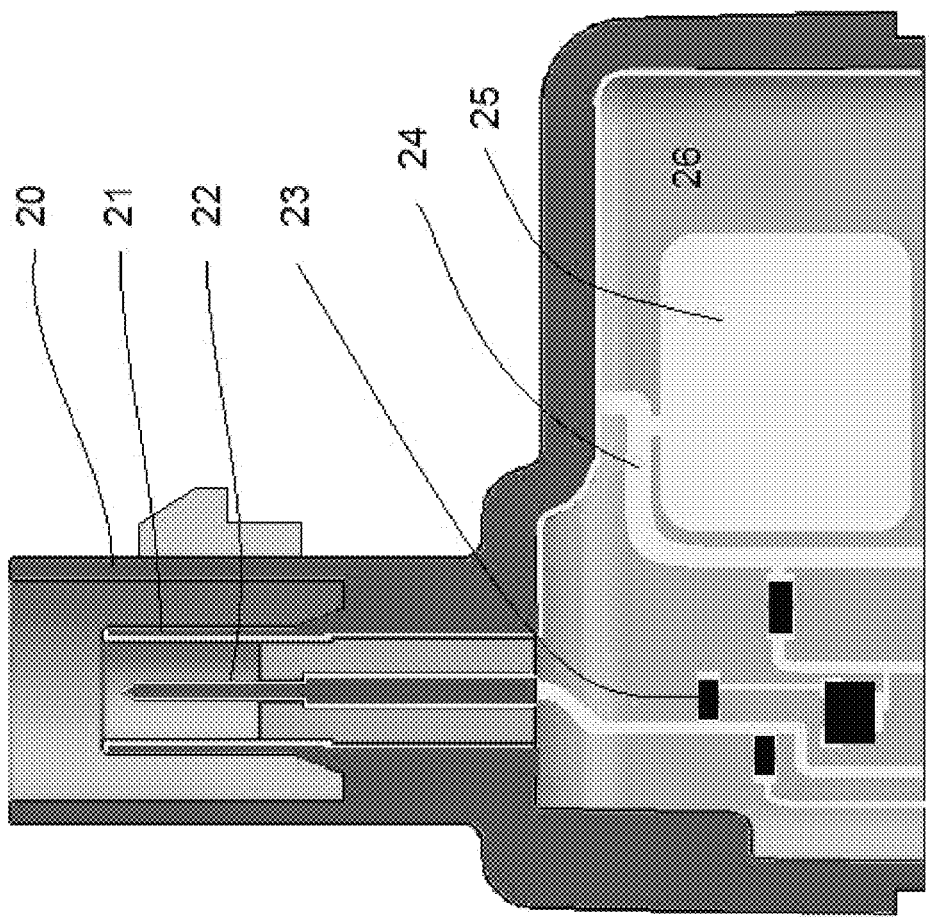
FIG. 40 shows a camera housing's rear body, with the connector structure made in one piece with the housing rear body by insertion molding, and with the connecting surfaces applied by MID technology.

As another aspect of the present invention, the coaxial connection may comprise a housing inherent leadframe structuring, such as made by Molded Interconnect Device (MID) technology. As shown in FIG. 40, a camera housing's rear body has a connector structure 20 made as one piece with the housing rear body, such as by insertion molding or injection molding. The connector structure comprises a conductive area 21 on a structure to mate with a coaxial connector's shield contact. The connecting surface is applied by MID and leads to the inside of the camera 26. The core pin portion 22 is also done by molding with the housing, with its surface also applied by MID. The camera rear housing's coaxial connector structure lead frame thus is made by MID and the core pin socket (or pin) and the shielding contact may be applied on top of the formed or molded structures. Optionally, the core pin socket (or pin) may be added by press fit attachment, or may be welded or soldered onto the structure while the shielding may be made by MID or the like. The camera housing may have conductive routing structures 24 and electronic components 23, with portions of the camera housing inner surface 25 being conductively plated by MID, such as by utilizing aspects of the cameras described in U.S. provisional application Ser. No. 62/032,660, filed on Aug. 4, 2014, which is hereby incorporated herein by reference in its entirety.

Therefore, the present invention provides a camera assembly for a vehicle vision system, with the camera assembly comprising a housing comprising a first housing portion (such as a front housing portion that includes circuitry and an imager established on a circuit element or circuit board and that includes a lens barrel having lens optics disposed at and aligned with the imager) and a second housing portion (such as a rear housing portion having a connector portion for connecting to a vehicle wiring). A circuit element (such as a printed circuit board or the like) is disposed within the first housing portion of the housing, with the circuit element comprising circuitry. The second housing portion comprises a connector portion configured for connecting to a vehicle wiring (such as socket configured to receive a plug of the vehicle wiring, with the terminals of the vehicle wiring connecting to connector elements at the socket when the plug is received in the socket) when the camera assembly is installed at a vehicle. A coaxial connector is disposed at the connector portion of the second housing portion. The coaxial connector comprises a plurality of electrical coaxial connector elements, with each of the electrical coaxial connector elements comprising (i) a first end that is configured for electrically connecting to the circuitry of the circuit element within the first housing portion and (ii) a second end that is configured for electrically connecting to the vehicle wiring, such as when a plug or connector of the vehicle wiring is received in the connector portion of the housing.

The coaxial connector may be press fit into the connector portion of the second or rear housing portion, or the connector portion may be overmolded over the coaxial connector, to retain the coaxial connector at or in the second housing portion. The coaxial connector may comprise a generally cylindrical body portion that is retained at the housing portion, with a plurality of terminals or connector elements at each end for electrically connecting to the vehicle wiring or the circuitry at the circuit element of the camera assembly. The body portion and/or the terminals or connector elements may be bent or formed to provide for an angled connector, depending on the particular application of the camera assembly. The coaxial connector and/or the circuitry or mating connector at the circuit element or board may comprise flexible elements or portions or spring-loaded pins or elements so that the coaxial connector and/or the circuitry or mating connector can accommodate misalignment or offset of the connector ends and the circuitry or mating connector during assembly of the camera.

Optionally, the coaxial connector may comprise a core contact or pin and a shield contact or outer contact, and the contacts may engage a brush mating connector (having a plurality of central contacts and a plurality of outer contacts separated or isolated from one another by an isolator or dielectric medium. Thus, when the camera housing portions are assembled together, the core contact or pin of the coaxial connector engages and electrically connects to the central contacts of the brush mating connector, while the shield or outer contact of the coaxial connector engages and electrically connects to the outer contacts of the brush mating connector.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/126715; WO 2013/043661 and/or WO 2013/158592 and/or PCT Application No. PCT/US2014/042229, filed Jun. 13, 2014, and/or U.S. patent application Ser. No. 14/573,307, filed Dec. 17, 2014; Ser. No. 14/573,306, filed Dec. 17, 2014; Ser. No. 14/572,018, filed Dec. 16, 2014; Ser. No. 14/572,017, filed Dec. 16, 2014; Ser. No. 14/568,177, filed Dec. 12, 2014; Ser. No. 14/561,794, filed Dec. 5, 2014; Ser. No. 14/558,981, filed Dec. 3, 2014; Ser. No. 14/535,739, filed Nov. 7, 2014; Ser. No. 14/524,203, filed Oct. 27, 2014; Ser. No. 14/519, 469, filed Oct. 21, 2014; Ser. No. 14/391,841, filed Oct. 10, 2014; Ser. No. 14/489,659, filed Sep. 18, 2014; Ser. No. 14/446,099, filed Aug. 22, 2014; Ser. No. 14/377,940, filed Aug. 11, 2014; Ser. No. 14/377,939, filed Aug. 11, 2014; Ser. No. 14/456,164, filed Aug. 11, 2014; Ser. No. 14/456,163, filed Aug. 11, 2014; Ser. No. 14/456,162, filed Aug. 11, 2014; Ser. No. 14/373,501, filed Jul. 21, 2014; Ser. No. 14/372,524, filed Jul. 16, 2014; Ser. No. 14/324,696, filed Jul. 7, 2014; Ser. No. 14/369,229, filed Jun. 27, 2014; Ser. No. 14/316,940, filed Jun. 27, 2014; Ser. No. 14/316,939, filed Jun. 27, 2014; Ser. No. 14/303,696, filed Jun. 13, 2014; Ser. No. 14/303,695, filed Jun. 13, 2014; Ser. No. 14/303, 694, filed Jun. 13, 2014; Ser. No. 14/303,693, filed Jun. 13, 2014; Ser. No. 14/297,663, filed Jun. 6, 2014; Ser. No. 14/290,028, filed May 29, 2014; Ser. No. 14/290,026, filed May 29, 2014; Ser. No. 14/282,029, filed May 20, 02014; Ser. No. 14/282,028, filed May 20, 2014; Ser. No. 14/358, 232, filed May 15, 2014; Ser. No. 14/272,834, filed May 8, 2014; Ser. No. 14/356,330, filed May 5, 2014; Ser. No. 14/269,788, filed May 5, 2014; Ser. No. 14/268,169, filed May 2, 2014; Ser. No. 14/264,443, filed Apr. 29, 2014; Ser. No. 14/354,675, filed Apr. 28, 2014; Ser. No. 14/248,602, filed Apr. 9, 2014; Ser. No. 14/242,038, filed Apr. 1, 2014;

Ser. No. 14/229,061, filed Mar. 28, 2014; Ser. No. 14/343,937, filed Mar. 10, 2014; Ser. No. 14/343,936, filed Mar. 10, 2014; Ser. No. 14/195,135, filed Mar. 3, 2014; Ser. No. 14/195,136, filed Mar. 3, 2014; Ser. No. 14/191,512, filed Feb. 27, 2014; Ser. No. 14/183,613, filed Feb. 19, 2014; Ser. No. 14/169,329, filed Jan. 31, 2014; Ser. No. 14/169,328, filed Jan. 31, 2014; Ser. No. 14/163,325, filed Jan. 24, 2014; Ser. No. 14/159,772, filed Jan. 21, 2014; Ser. No. 14/107,624, filed Dec. 16, 2013; Ser. No. 14/102,981, filed Dec. 11, 2013; Ser. No. 14/102,980, filed Dec. 11, 2013; Ser. No. 14/098,817, filed Dec. 6, 2013; Ser. No. 14/097,581, filed Dec. 5, 2013; Ser. No. 14/093,981, filed Dec. 2, 2013; Ser. No. 14/093,980, filed Dec. 2, 2013; Ser. No. 14/082,573, filed Nov. 18, 2013; Ser. No. 14/082,574, filed Nov. 18, 2013; Ser. No. 14/082,575, filed Nov. 18, 2013; Ser. No. 14/082,577, filed Nov. 18, 2013; Ser. No. 14/071,086, filed Nov. 4, 2013; Ser. No. 14/076,524, filed Nov. 11, 2013; Ser. No. 14/052,945, filed Oct. 14, 2013; Ser. No. 14/046,174, filed Oct. 4, 2013; Ser. No. 14/036,723, filed Sep. 25, 2013; Ser. No. 14/016,790, filed Sep. 3, 2013; Ser. No. 14/001,272, filed Aug. 23, 2013; Ser. No. 13/970,868, filed Aug. 20, 2013; Ser. No. 13/964,134, filed Aug. 12, 2013; Ser. No. 13/942,758, filed Jul. 16, 2013; Ser. No. 13/942,753, filed Jul. 16, 2013; Ser. No. 13/927,680, filed Jun. 26, 2013; Ser. No. 13/916,051, filed Jun. 12, 2013; Ser. No. 13/894,870, filed May 15, 2013; Ser. No. 13/887,724, filed May 6, 2013; Ser. No. 13/852,190, filed Mar. 28, 2013; Ser. No. 13/851,378, filed Mar. 27, 2013; Ser. No. 13/848,796, filed Mar. 22, 2012; Ser. No. 13/847,815, filed Mar. 20, 2013; Ser. No. 13/800,697, filed Mar. 13, 2013; Ser. No. 13/785,099, filed Mar. 5, 2013; Ser. No. 13/779,881, filed Feb. 28, 2013; Ser. No. 13/774,317, filed Feb. 22, 2013; Ser. No. 13/774,315, filed Feb. 22, 2013; Ser. No. 13/681,963, filed Nov. 20, 2012; Ser. No. 13/660,306, filed Oct. 25, 2012; Ser. No. 13/653,577, filed Oct. 17, 2012; and/or Ser. No. 13/534,657, filed Jun. 27, 2012, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. patent application Ser. No. 13/202,005, filed Aug. 17, 2011, which are hereby incorporated by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and 6,824,281, and/or International Publication Nos. WO 2010/099416; WO 2011/028686 and/or WO 2013/016409, and/or U.S. Pat. Publication No. US 2010-0020170, and/or U.S. patent application Ser. No. 13/534,657, filed Jun. 27, 2012, which are all hereby incorporated herein by reference in their entireties. The camera or cameras may comprise any suitable cameras or imaging sensors or camera modules, and may utilize aspects of the cameras or sensors described in U.S. patent application Ser. No. 13/260,400, filed Sep. 26, 2011, and/or U.S. Publication No. US-2009-0244361, and/or U.S. Pat. Nos. 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580 and/or 7,965,336, and/or International Publication Nos. WO/2009/036176 and/or WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. Nos. 7,255,451 and/or 7,480,149, and/or U.S. Publication No. US-2006-0061008, and/or U.S. patent application Ser. No. 12/578,732, filed Oct. 14, 2009, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO2012/075250; WO 2013/019795; WO 2012/075250; WO 2012/145822; WO 2013/081985; WO 2013/086249 and/or WO 2013/109869, and/or U.S. patent application Ser. No. 13/333,337, filed Dec. 21, 2011, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. Publication Nos. US-2006-0061008 and/or US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and/or 6,124,886, and/or U.S. Publication No. US-2006-0050018, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A camera assembly for a vehicle vision system, said camera assembly comprising:

a housing comprising a first housing portion and a second housing portion;

a circuit element disposed within said first housing portion of said housing, said circuit element comprising circuitry;

wherein said second housing portion of said housing comprises a connector portion configured for connecting to a vehicle wiring when said camera assembly is installed at a vehicle;

a coaxial connector disposed at said connector portion of said second housing portion, said coaxial connector comprising a plurality of electrical connector elements, wherein each of said electrical connector elements comprises (i) a first end that is configured for electrically connecting to said circuitry of said circuit element within said first housing portion and (ii) a second end that is configured for electrically connecting to the vehicle wiring;

wherein said first ends of said electrical connector elements are not coaxial and wherein said second ends of said electrical connector elements are coaxial;

wherein said first ends of said electrical connector elements electrically connect to a mating connector disposed at said circuit element; and wherein said mating connector comprises a plurality of receiving portions for receiving said first ends of said electrical connector elements.

2. The camera assembly of claim 1, wherein said electrical connector elements adjust so that said first ends engage said circuitry and make electrical connection therewith during assembly of said camera assembly.

3. The camera assembly of claim 2, wherein said electrical connector elements adjust via one of (i) a flexible portion of said electrical connector elements and (ii) a spring-loaded portion of said electrical connector elements.

4. The camera assembly of claim 1, wherein said mating connector disposed at said circuit element is made by at least one of (i) metal stamping and (ii) metal folding.

5. The camera assembly of claim 1, wherein said mating connector comprises at least two electrically conductive brush contacts separated by a non-electrically conductive insulator, and wherein said first end of a first electrical connector element of said electrical connector elements electrically connects with one of said electrically conductive brush contacts and said first end of a second electrical connector element of said electrical connector elements electrically connects with the other of said electrically conductive brush contacts.

6. The camera assembly of claim 5, wherein said first electrical connector element comprises a core connector of said connector and said second electrical connector element comprises a shield connector of said connector.

7. The camera assembly of claim 1, wherein said electrical connector elements are made by at least one of (i) metal stamping and (ii) metal folding.

8. The camera assembly of claim 7, wherein said connector is fixedly disposed at said second housing portion by molding.

9. The camera assembly of claim 1, wherein said electrical connector elements comprise a core connector and a shield connector, and wherein said core connector is fixed to said shield connector by molding.

10. The camera assembly of claim 1, wherein said connector is fixed to said second housing portion by at least one fastener.

11. The camera assembly of claim 1, wherein said connector is fixed to said second housing portion by at least one clip.

12. The camera assembly of claim 1, wherein said connector is fixed to said second housing portion via adhesive.

13. The camera assembly of claim 1, wherein said connector comprises a connector for an inbound coaxial cable that conveys at least one of electrical signals and data to said circuitry.

14. The camera assembly of claim 1, wherein said electrical connector elements comprise angled elements and wherein said first ends angled relative to said second end.

15. A camera assembly for a vehicle vision system, said camera assembly comprising:
a housing comprising a first housing portion and a second housing portion;
a circuit element disposed within said first housing portion of said housing, said circuit element comprising circuitry;
wherein said second housing portion of said housing comprises a connector portion configured for connecting to a vehicle wiring when said camera assembly is installed at a vehicle;
a coaxial connector disposed at said connector portion of said second housing portion, said coaxial connector comprising a plurality of electrical coaxial connector elements, wherein each of said electrical coaxial connector elements comprises (i) a first end that is configured for electrically connecting to said circuitry of said circuit element within said first housing portion and (ii) a second end that is configured for electrically connecting to the vehicle wiring;
wherein said first ends of said electrical coaxial connector elements electrically connect to a mating connector disposed at said circuit element;
wherein said mating connector comprises at least two brush contacts separated by an insulator, and wherein a first connector element of said electrical coaxial connector elements electrically connects with one of said brush contacts and a second connector element of said electrical coaxial connector elements electrically connects with the other of said brush contacts; and
wherein said first ends of said electrical coaxial connector elements engage said brush contacts of said mating connector and make electrical connection therewith during assembly of said camera assembly.

16. The camera assembly of claim 15, wherein said first connector element comprises a core connector of said coaxial connector and said second connector element comprises a shield connector of said coaxial connector.

17. A camera assembly for a vehicle vision system, said camera assembly comprising:
a housing comprising a first housing portion and a second housing portion;
a circuit element disposed within said first housing portion of said housing, said circuit element comprising circuitry;
wherein said second housing portion of said housing comprises a connector portion configured for connecting to a vehicle wiring when said camera assembly is installed at a vehicle;
a coaxial connector disposed at said connector portion of said second housing portion, wherein one of (i) said coaxial connector is press fit into said connector portion of said second housing portion and (ii) said connector portion of said second housing portion is overmolded over said coaxial connector;
wherein said coaxial connector comprises a plurality of electrical connector elements, wherein each of said electrical connector elements comprises (i) a first end that is configured for electrically connecting to said circuitry of said circuit element within said first housing portion and (ii) a second end that is configured for electrically connecting to the vehicle wiring;
wherein said first ends of said electrical connector elements electrically connect to a mating connector disposed at said circuit element; and
wherein said mating connector comprises a plurality of receiving portions for receiving said first ends of said electrical connector elements.

18. The camera assembly of claim 17, wherein said electrical connector elements adjust so that said first ends engage said circuitry and make electrical connection therewith during assembly of said camera assembly, and wherein said electrical connector elements adjust via one of (i) a flexible portion of said electrical connector elements and (ii) a spring-loaded portion of said electrical connector elements.

* * * * *

UNITED STATES PATENT AND TRADEMARK OFFICE
CERTIFICATE OF CORRECTION

PATENT NO. : 10,298,823 B2
APPLICATION NO. : 14/609650
DATED : May 14, 2019
INVENTOR(S) : Stefan Sauer et al.

It is certified that error appears in the above-identified patent and that said Letters Patent is hereby corrected as shown below:

In the Claims

Column 19
Lines 8-10, Claim 6, insert --coaxial-- after "connector of said" in both instances
Lines 14-15, Claim 8, insert --coaxial-- before "connector"
Lines 21-22, Claim 10, insert --coaxial-- before "connector"
Lines 24-25, Claim 11, insert --coaxial-- before "connector"
Lines 27-28, Claim 12, insert --coaxial-- before "connector"
Lines 29-30, Claim 13, insert --coaxial-- before "connector"

Signed and Sealed this
Eighteenth Day of June, 2019

Andrei Iancu
*Director of the United States Patent and Trademark Office*